(12) United States Patent
Maenz

(10) Patent No.: US 8,205,834 B2
(45) Date of Patent: Jun. 26, 2012

(54) SUPPORT STRUCTURE FOR A WING

(75) Inventor: Christian Maenz, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 967 days.

(21) Appl. No.: 12/063,699

(22) PCT Filed: Aug. 16, 2006

(86) PCT No.: PCT/EP2006/008077
§ 371 (c)(1),
(2), (4) Date: Mar. 28, 2008

(87) PCT Pub. No.: WO2007/020069
PCT Pub. Date: Feb. 22, 2007

(65) Prior Publication Data
US 2010/0170995 A1    Jul. 8, 2010

Related U.S. Application Data

(60) Provisional application No. 60/709,146, filed on Aug. 17, 2005.

(30) Foreign Application Priority Data

Aug. 17, 2005   (DE) .......................... 10 2005 038 849

(51) Int. Cl.
*B64C 3/22* (2006.01)
(52) U.S. Cl. .................................................. 244/123.4
(58) Field of Classification Search ............... 244/123.4, 244/131; 403/169, 170; 52/81.3, 653.2, 52/655.1
See application file for complete search history.

(56) References Cited

U.S. PATENT DOCUMENTS

| | | | | |
|---|---|---|---|---|
| 1,545,129 A | * | 7/1925 | Cook, Jr. ....................... | 52/653.2 |
| 1,555,409 A | | 9/1925 | Gilmore | |
| 1,773,357 A | | 8/1930 | Griswold, 2D | |
| 1,914,344 A | * | 6/1933 | Ragsdale ....................... | 403/170 |
| 2,001,215 A | * | 5/1935 | Ruppel ......................... | 52/653.2 |
| 2,098,752 A | * | 11/1937 | Miller ........................... | 244/131 |
| 4,308,699 A | * | 1/1982 | Slysh ............................. | 52/108 |
| 4,332,501 A | * | 6/1982 | Slysh ............................ | 403/219 |

FOREIGN PATENT DOCUMENTS

| | | |
|---|---|---|
| AT | 78501 | 9/1919 |
| CH | 195404 | 5/1938 |

(Continued)

OTHER PUBLICATIONS

English translation of the "Notice of Reasons for Rejection" from the Japan Patent Office dated Oct. 11, 20112 for Japanese Patent Application No. 2008-526438, 2 pages.

*Primary Examiner* — Tien Dinh
*Assistant Examiner* — Michael Kreiner
(74) *Attorney, Agent, or Firm* — Christopher Paradies; Fowler White Boggs P.A.

(57) ABSTRACT

A support structure for an aircraft, includes one or several bar elements and one or several junction elements. At least one bar element includes a transition region which can be made to engage at least one junction element. When the transition region of the bar element engages at least one junction element, centric force transmission takes place between the bar element and the junction element.

12 Claims, 14 Drawing Sheets

FOREIGN PATENT DOCUMENTS

| | | |
|---|---|---|
| DE | 473098 | 3/1929 |
| DE | 586542 | 10/1933 |
| DE | 612794 | 3/1936 |
| DE | 630297 | 5/1936 |
| DE | 3721092 A1 | 2/1988 |
| DE | 19613090 A1 | 10/1996 |
| DE | 19920427 A1 | 11/2000 |
| DE | 19921690 A1 | 11/2000 |
| DE | 202004015047 U1 | 2/2005 |
| DE | 202004015883 U1 | 2/2005 |
| FR | 673.934 | 1/1930 |
| FR | 673934 | 1/1930 |
| GB | 151085 | 9/1920 |
| GB | 462390 | 3/1937 |
| GB | 2128706 A | 5/1984 |
| SU | 1186845 a | 10/1985 |

* cited by examiner

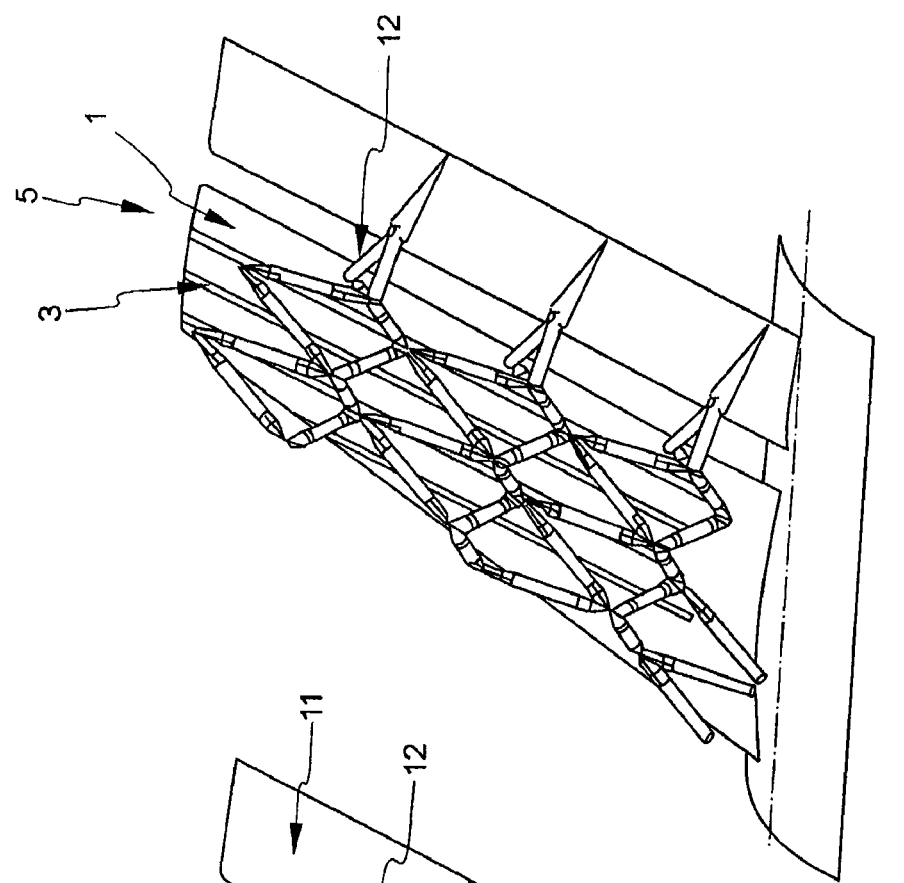
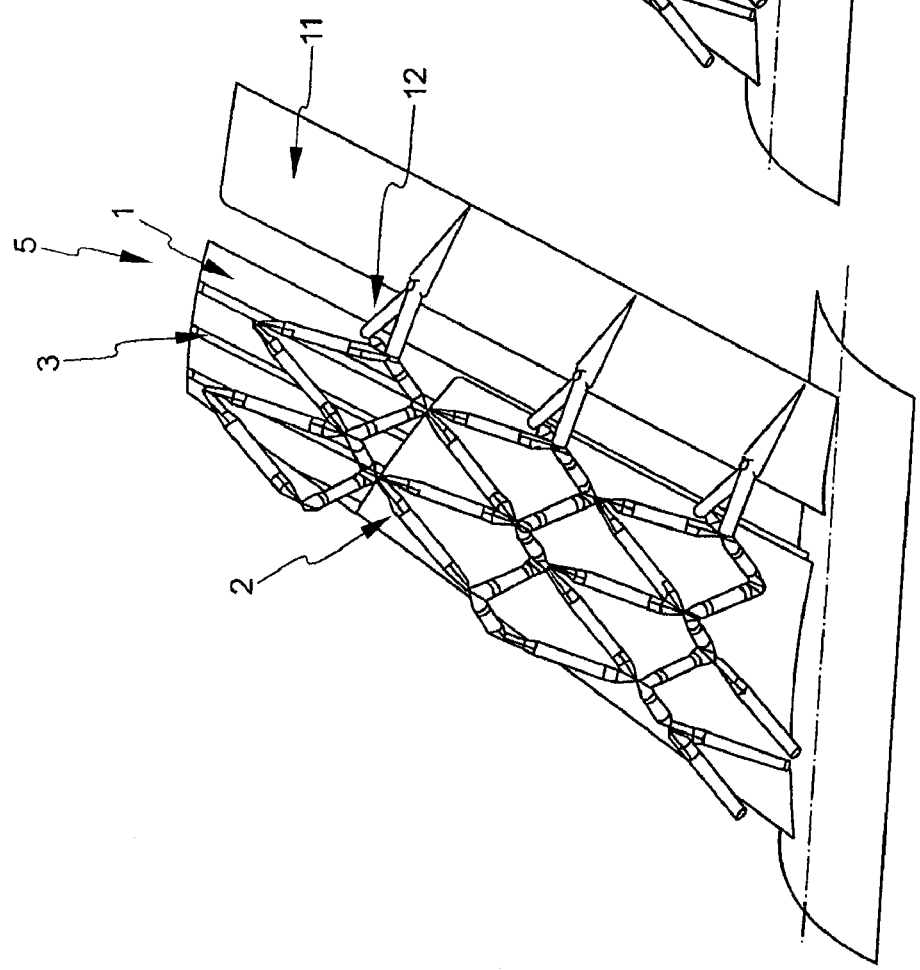
Fig. 13
Fig. 12

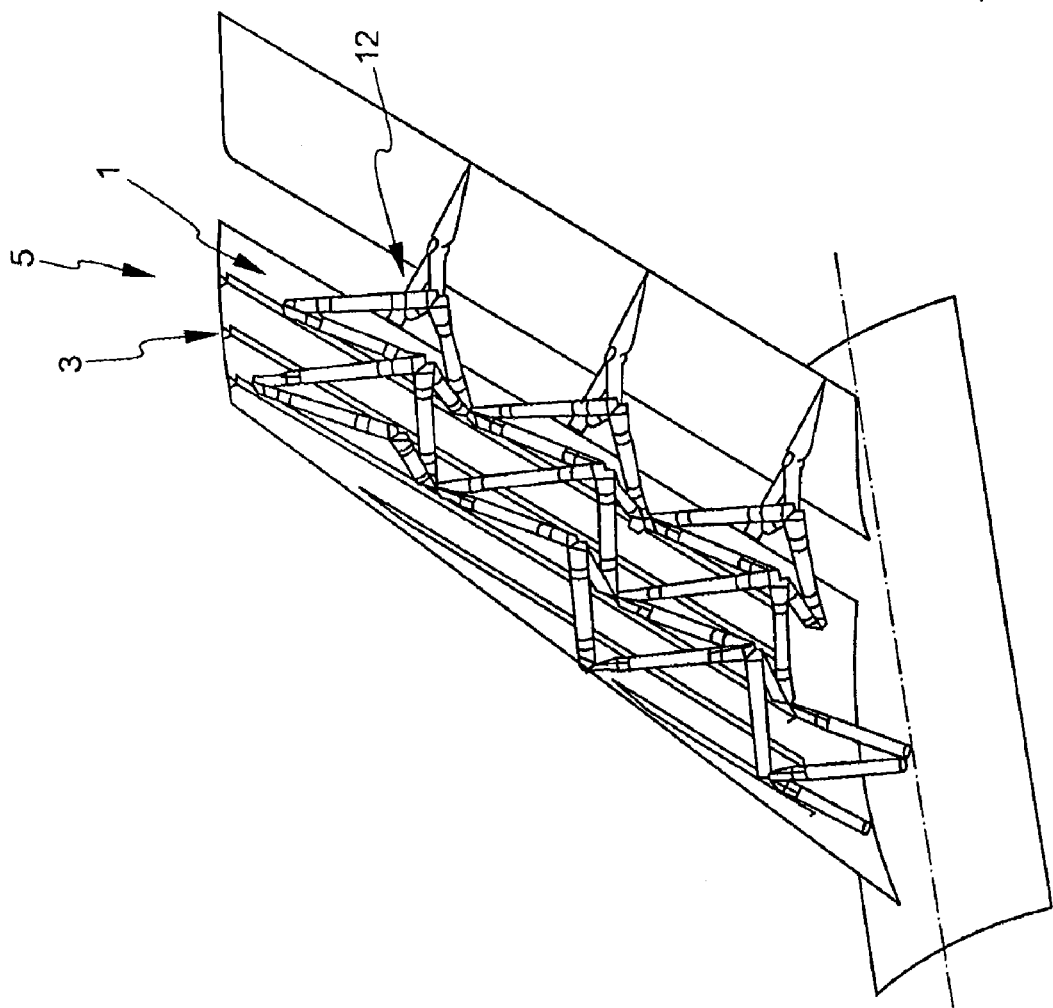
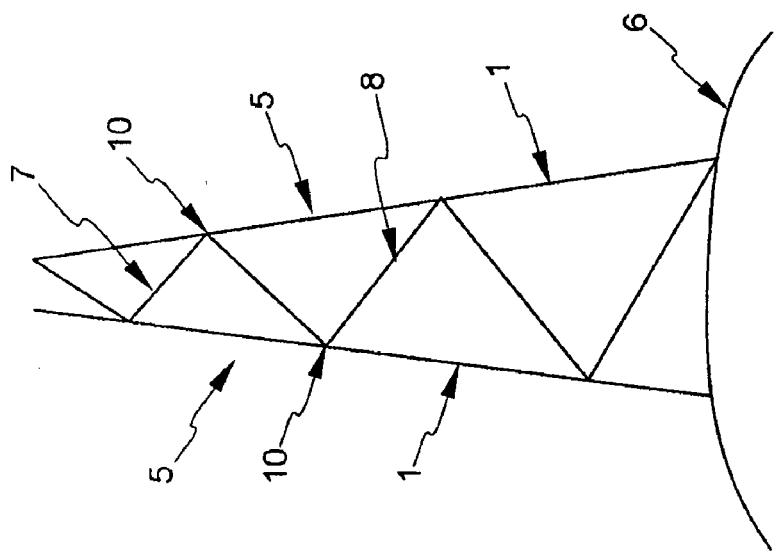
Fig. 14
Fig. 15

SUPPORT STRUCTURE FOR A WING

REFERENCE TO RELATED APPLICATIONS

This application claims the benefit of the filing date of U.S. Provisional Patent Application No. 60/709,146 filed Aug. 17, 2005 and of German Patent Application No. 10 2005 038 849.3 filed Aug. 17, 2005, the disclosures of each of which is hereby incorporated herein by reference.

FIELD OF THE INVENTION

The field generally relates to the technical field of statics. In particular, the field relates to a support structure, a connection element, a junction element for a support structure, a wing, a method for force transmission between a bar element and a junction element, a method for producing a connection element, the use of a support structure in an aircraft, and an aircraft comprising a support structure.

BACKGROUND

In the construction of aircraft, highly loaded frameworks comprising U-profiles or double T-profiles are built. Furthermore, bars with rectangular profiles are frequently used, for example, in the lower ribs of the center box of the vertical tail unit of the A380. While such profiles are suitable for constructing highly loadable frameworks, these bars will then however have to be relatively solid. This results in an increase in the weight of the highly loadable framework. In the case of relatively light loads, so-called SARMA® rods are used.[1] For example, SARMA® rods are used for floor supports. However, due to their insufficient dimensioning, SARMA® rods are not suitable for highly loaded frameworks.

[1]SARMA® is an expired U.S. trademark of SKF Compagnie d'Applications Mecanique, Sur-Rhone, France.

Tube connection systems are known from the documents DE 199 21 690 B4, DE 20 2004 015 883 U1, DE 199 20 427 A1, DE 37 21 092 C2 and DE 20 2004 015 047 U1.

Buckling under pressure load is the critical load case for a brace/bar in a framework, because due to the moment-free design of frameworks, predominantly tensile forces or pressure forces are encountered. In spite of corresponding force distribution and force transfer to the entire framework, it is nonetheless possible for substantial individual pressure forces to act in individual braces, in particular in the case of substantial overall forces, acting on the structure.

In particular, at the so-called framework junction points, i.e., at the end of the framework bars, complex and heavy connections must be used.

In the case of aircraft, the center boxes of aircraft wings are, as a rule, subjected to substantial loads. In particular, the center boxes have to reliably transfer transverse loads and the associated bending loads to the aircraft fuselage. Since, as a rule, the center boxes comprise two opposite lateral surfaces, the bending load to which a center box is subjected results in a pressure load in one side surface and in a tensile force in the other side area perpendicular to a bottom panel to which the center box is attached. The center boxes are designed as box supports. That is, the construction of a center box comprises shells that are reinforced by spars, ribs and stringers. With the use of these components, local stiffening of the center boxes is to be achieved. However, in order to accommodate the substantial forces acting on the center boxes, the spars, ribs or stringers have to be of solid, i.e., of very heavy, construction.

In order to accommodate substantial forces, usually many large components are necessary. On the one hand, this results in disadvantages in the case of production errors because the large components have to be repaired at considerable expenditure. On the other hand, in particular by using ribs, it is not possible to transfer introduced loads, such as for example, loads that result from pressure forces or tensile forces during flight manoeuvres of an aircraft, in the shortest way to the fuselage connection. Thus, a known construction of a support structure for a center box, comprising spars, ribs and stringers attains great strength only if it is of a correspondingly heavy weight.

SUMMARY OF THE INVENTION

It may be an object to provide an improved support structure for an aircraft.

Accordingly, a support structure for an aircraft, a connection element for a support structure, a junction element for a support structure, a wing comprising a support structure, a method for force transmission between a bar element and a junction element, the use of a support structure in an aircraft, and an aircraft comprising a support structure with the features disclosed.

In the context of the support structure, the term "force" refers to both pressure force and tensile force.

According to one embodiment, a support structure for an aircraft comprises at least one bar element and at least one junction element. In this arrangement, the at least one bar element comprises a transition region which may be made to engage the at least one junction element so that there is at least partial overlap. In this arrangement, the transition region of the at least one bar element is shaped such that when the transition region engages the at least one junction element, a force is centrically transferred between the bar element and the at least one junction element.

A partly overlapping connection may be helpful to achieve symmetrical or centric introduction of a force into the junction element. A two-shear connection, for example, comprises two faces which rest in a plane manner against a junction element on both sides. In this way, a force may be symmetrically introduced into the junction element.

According to another embodiment, a connection element for a support structure with a basic body is provided. The basic body comprises a first end that may be connected to a bar element. Furthermore, the basic body of the connection element comprises a second end that may be made to engage the junction element such that there is at least partial overlap. In this arrangement, the basic body of the connection element is shaped such that when the basic body of the connection element engages the junction element, a force is centrically transmitted between the bar element and the junction element. In this context, the term "engage" means that sections are interconnected by a connection element or fastening element.

According to yet another embodiment, a junction element for a support structure is provided. The junction element comprises at least one attachment surface or an attachment region. In this arrangement, the attachment region is shaped in such a way so to be at least partly accommodated, so as to overlap, by a transition region of a bar element. In other words, the transition region of a bar element may partly overlap or flank the junction element.

Furthermore, according to another embodiment, a wing comprises a support structure, a connection element and/or a junction element.

In the context of the support structure, the term "wing" refers to any type of wing. In particular, the term refers to an aircraft wing, wherein the term "aircraft wing" is to be interpreted in its broadest sense. In particular, the term "aircraft wing" refers to airfoils, horizontal tail units, and vertical tail units. As an example of an aircraft wing, the design of a vertical tail unit is stated below. A vertical tail unit comprises a leading-edge region, a load-bearing center box, an end box, as well as a control surface or rudder.

Furthermore, according to another embodiment, a method for force transmission between a bar element and a junction element by a connection element is provided. To this effect, first, a bar element is connected to a first end of a basic body of the connection element. Furthermore, on a second end of the basic body of the connection element, a junction element is connected so that there is at least partial overlap; thereafter between the bar element and the junction element, centrically a force is transmitted or exchanged. In this arrangement, transmission of the force may take place both from the bar element to the junction element and from the junction element to the bar element.

According to a further embodiment, the use of a support structure in an aircraft is provided.

According to yet another embodiment, an aircraft with a support structure is provided.

According to embodiments, there is a centric force transmission between the bar element and the junction element. In other words, this means that transmission of a force takes place along an effective line of force, wherein the effective line of force extends through the center planes or center lines, symmetry lines and/or symmetry planes or center of mass lines or center of mass planes of all the components involved in the distribution of the force. That is, that if, for example, the force is transmitted along a tube, a formed piece and a junction point, the effective line of the transmitted force extends through the center plane of the junction point, the center line of the formed piece and the center line of the tube. Advantageously, in this way, force distribution may take place that may be free of any moments. A moment may arise if a force acts at a particular distance from a center plane or a center line. In this case, the distance acts as a lever that may cause a moment to be impressed.

If consequently the effect or the path of a force extends precisely on the center plane, or if the effective line of a force to be transmitted extends through the center plane of the components, then no moment may arise so that as a result of this, no additional loads as a result of bending are generated. Advantageously, it is thus allowable to substantially determine the gradient of a force in advance. With this knowledge of the force gradient, a structure, for example, a wing or an element of a wing, may be better dimensioned. Furthermore, clamping forces may be prevented.

Apart from the bending moments that occur in an eccentric connection, by centric force transmission, the moments that also occur in the case of an eccentric connection may be prevented. Moments may arise if components are attached eccentrically, i.e. at a distance from the central plane of another component. Additional loads as a result of bending may, however, be prevented by a completely symmetric design. To be free of any moments also means that, for example, no moments are transmitted. The build-up of additional stress may thus for example be prevented.

For example, by providing a transition region on a bar element, a center line of the bar element may be brought into line with a center line of a junction element and may be held. The transition region of the bar element may be made to engage a junction element in such a way that the center line of the bar element, including the center line of the transition region, is in alignment with the center line or center plane of a junction element.

If the junction element is, for example, rectangular or cuboid, then its center line, center of mass line or center plane extends in the middle of two delimitation surfaces of the cuboid junction element. For example, a center line of a bar may also be in alignment with the center of mass of a junction element or junction plate.

By a transition region on the bar element, the bar element or the center line of the bar element may be positioned above the center line of the junction element in such a way that an imaginary continuation of the center line of the bar element meets up with the center line or the center plane of the junction element. There is no distance from the center plane or center line that would cause a moment. The force introduction of a force acting along the bar element in the direction of the junction element may thus be introduced completely to the junction element free of any moments, i.e., without a moment arising.

Bending moments in the junction element or onto the junction element may thus be prevented. The force may consequently propagate symmetrically on the center line or center plane of the junction element. With this force propagation moments from arising because forces act either directly onto the center line or because moments may be prevented that occur as a result of forces acting at a distance from the center line mutually and symmetrically cancel each other out.

According to a further embodiment, the transition region of the bar element, support element or brace comprises a first end with a first cross-sectional shape and a second end with a second cross-sectional shape. In this arrangement, the first and the second cross-sectional shape may be different.

Consequently, the transition region may serve to form a transition between the first cross-sectional shape and the second cross-sectional shape. Such a transition may be advantageous because, for example, the bar element may be of a cross-sectional shape that is advantageous for reasons of statics, while it is to be connected to another element that may comprise another cross-sectional shape.

The transition region may directly adjoin the bar element or go into the bar element. Furthermore, the transition region may be produced by remodelling an end region of the bar element. The transition region may thus form an integral part of the bar element.

Furthermore, the transition region may be attached to one end of the bar element by a top, a connection, a continuation, an adapter or some other adapting unit on one end of the bar element. In this arrangement, the transition region is to meet the statics requirements. It is to be shaped for optimal and centric force transmission between the bar element and a further element that is to be attached to the bar element.

The transition region allows for transmission that is free of any moments between the bar element and a further component attached to the bar element. Advantageously, the transition region as well as the bar element itself may be of symmetrical design.

According to a further embodiment, the transition region comprises an substantially round cross-sectional shape. The bar element may, for example, be a rod. The rod may be of a solid material. If the transition region has a round end, optimum introduction of a force from the bar element to the transition region may take place.

The transition region may be formed from one end of the bar element. In this way, the necessity for a further component or element in the transition region may be avoided. A bar element may be produced that already comprises a corresponding transition region. Advantageously, in this way, inhomogeneities or contact points may be prevented or reduced.

According to a further embodiment, the at least one bar element comprises an substantially tubular cross-sectional shape. In another embodiment, the at least one bar element comprises a substantially round cross-sectional shape. "Substantially tubular" includes shapes from circular, square, hexagonal or rectangular. It may in particular be advantageous for a support structure to use a thin-walled tube with the largest allowable diameter for connection to a framework junction. A large tube diameter results in low slimness ratios, which in turn result in increased permissible stress, as a result of which construction, better material utilization is allowed.

A thin-walled tube of light weight is to be able to accommodate a large load F. Below, the advantage of a thin-walled tube is explained. First, a force F that is to be transmitted, for which force a bar element is to be designed, and a bar length l are to be considered as given.

The weight of a tubular profile is:

$$G = V \times \rho$$

V denotes the volume of the tubular profile, while $\rho$ denotes the specific mass of the material from which the tubular profile is made. A denotes the cross section onto which the force F acts, while $\sigma$ denotes the mechanical (buckling-) strain.

With
V=A×l and the area $$A = \frac{F}{\sigma}$$

required for the force F and with the application of Euler's formula relating to buckling loads $$\sigma = \frac{\pi^2 E}{\lambda^2}$$

the following applies:

$$G = \frac{1}{\pi^2} \cdot F_K \cdot 1 \cdot \frac{\rho}{E} \cdot \lambda^2$$

Thus, the weight is reduced if a material with a large modulus of elasticity E and a low specific mass $\rho$ is selected.

Furthermore, the weight may be reduced by way of reducing the geometric parameter of the fineness ratio or thickness ration $\lambda$.

The following formula of the fineness ratio $$\lambda = \frac{1}{\sqrt{I_y/A}}$$

shows that the second order geometrical moment of inertia $I_y$ (Flächenträgheitsmoment) increases as the fineness ratio $\lambda$ decreases.

Since for a thin-walled tube with a mean tube diameter $d_m$ and a wall thickness s by approximation $$\frac{s}{d_m} \ll 1,$$

i.e. for example in the region of 0.05 to 0.1, the following applies:

$$\text{with } I_y = \frac{\pi}{8} \cdot d_m^3 \cdot s \text{ and } A = \pi \cdot d_m \cdot s,$$

$$I_y = \frac{1}{8} \cdot d_m^2 \cdot A.$$

This shows that $d_m$ should be enlarged, in order to, with a predefined area A, achieve a large $I_y$. So as not to infringe the condition for a thin-walled tube $$\frac{s}{d_m} \ll 1$$

consequently, a thin wall thickness s should be selected.

However, it should be taken into account that if too thin a wall thickness s has been selected, local buckling may occur. Consequently, a certain minimum wall thickness should be maintained so as to prevent failure of the component.

Furthermore, for $\sigma$, lower values should be used in the plastic or ductile region than the values that correspond to Euler's formula relating to buckling loads.

For example, tubes and thus also their transition regions are designed for pressure loads and tensile loads of a magnitude of 20 to 30 tons or of 15 to 50 tons of load.

Loads of this magnitude may, for example, occur if tubes are used as bar elements in support structures for a vertical tail unit. During flight manoeuvres, loads may act on the exterior surface of a vertical tail unit, which loads are to be taken away by the support structure. The surface load may be such that the load in the individual tubes, or the force that acts as a pressure load or tensile load from the surface load in the tubes, may reach the magnitude stated above.

Similarly, forces as a result of gusts that act on a parked aircraft, in particular on the vertical tail unit of a parked aircraft or on an aircraft wing, may generate corresponding forces. The details relating to permissible forces may be used as upper limits in the dimensioning of corresponding bars, bar elements or tubes for support structures. Designs for greater forces are also allowable.

Advantageously, the use of a support structure in an aircraft may contribute to weight reduction during construction. An aircraft with a support structure may provide great stability while being light in weight.

Materials that may be used for the production of tubes or bar elements are, for example, carbon-fiber reinforced plastics or metals such as titanium.

According to a further embodiment, the second end of the transition region is substantially sheet-like. A sheet-like design may, for example, be a symmetric flattening of a tube. In the symmetric flattening of a tube, the flat end of the transition region may be widened or enlarged. Consequently, a transition region of a tubular bar element may comprise a continuous transition from tubular to line shaped. Such a shape is approximately similar to the shape of a tube. (i.e., as in the shape of a toothpaste.)

A sheet-like shape of an end region of a tube may allow one to attach a tube to a cuboid or sheet-like connection piece. The sheet-like part of the transition region may be attached to the sheet-like region of a connection piece so as to be positive locking. With this design, evenly force transmission may be achieved. Moreover, the sheet-like shape may be advantageous in relation to attachment methods. For example, rivets or screws may be attached better to sheet-like regions. Similarly, adhesive connections are allowed in the case of sheet-like regions. In this arrangement, attachment is substantially without imposing stress.

According to a further embodiment, the second end of the transition region comprises a beak shape or clamp shape. In this context, the term "beak-shaped" refers to two areas facing each other, spaced apart, so as to be substantially parallel. The space may, for example, be a recess, for example milled out, in the material. A beak-shaped transition region involves symmetry. For example, a plug-type connection, (for example, Steckverbindung) may be established by a beak-shaped transition region.

In this arrangement in the spacing or gap between the two flat regions, a further element may be plugged. If this second element is also a sheet-like object, for example, a cuboid object, then a connection having a precise fit may be established between the two elements. As is the case with a symmetrical design, a connection having a precise fit may prevent bending moments from arising as a result of asymmetries or inhomogeneities.

By a connection having a precise fit, clamping forces may be prevented. A connection having a precise fit may prevent undesirable spacings which are compensated for by bending the material during installation. Elements that adjoin with a precise fit may be coupled without any gaps. In this way, in the case of highly loaded components, additional stress forces that may arise during clamping (clamping forces), may be prevented. Thus, aspects of weight reduction as a result of good materials use may be taken into account. The prevention of stress concentration may allow one to use fiber reinforced materials.

A sheet-like end of a transition region and/or a widened area of the transition region may result in an improved attachment option for a connection element. For example, on larger areas, more attachment elements such as for example, rivets or screws, may be attached, or rivets or screws may be attached with added resistance to breaking out.

According to a further embodiment, the transition region of a bar element is a connection element, such as a tubular connection. In this arrangement, the connection element may be separable from the bar element. That is, the bar element may, for example, be manufactured independently of the connection element or of the transition region. Moreover, the bar element and the connection element may be made of different materials. Therefore, a connection element may be a removable transition region of a bar element.

Consequently bar elements and connection elements as standard components (for example, Normteile) may be produced, and, depending on the connection required, to use a corresponding connection element that may, allow a corresponding transition region for the centric introduction of a tensile force or pressure force.

A separable design of the transition region means that there may be no need for the bar element to have a transition region. The connection element is attachable in or to the bar element and is thus also exchangeable. Standard parts may, for example, be produced with certain diameters or lengths. In a modular way, any bar elements with transition regions or without transition regions may be combined with, or supplemented by, or adapted to, corresponding connection elements.

The use of standard parts may have advantages in inventory management because of the reduced number of parts that have to be kept. Furthermore, for example, the transition region and the bar element may be made from different materials. In this way, different requirements concerning the load bearing ability of the transition regions or the regions for transferring a force from one cross-sectional shape to another cross-sectional shape may be achieved. Furthermore, in the case of material faults, only the affected individual parts need to be exchanged.

Due to the small number of identical elements, in the case of series production that is allowed by the use of standard parts, simple production and large number of pieces may be allowable. For example, connection elements may be attached to each end of a tube. Consequently, in the case of a connection element that is not axially symmetrical, on one end of a tube or on the other end of a tube, an installation of the connection element that is rotated on the longitudinal axis is produced. Such rotation of, for example, 90 degrees may be advantageous for installation in various positions. Rotation may take place on the longitudinal axis of the tube.

According to a further embodiment, the connection element is an one-piece connection element, i.e. is integrally formed. For example, a one-part design may offer advantages in production. Furthermore, for example in the case of tubular bar elements, connection elements may partly be produced using turning methods.

According to a further embodiment, the connection element may be several parts, for example, in two parts. A two-part design of the connection element may be associated with advantages in the attachment of the connection element to the bar element. For example, two-part connection elements may be shell-shaped in design. That is, two half-shells may be fitted to the ends of a tube. Consequently, each half-shell may be fitted on its own and independently of the other half shell to the exterior wall or interior wall of a tube.

In this way, precise fittings, i.e., fittings with as little clearance space, as allowable, may be achieved. A clearance or free space may arise if the inside of a shell does not rest against the exterior wall of the tube. Precisely fitting the half-shells to the interior wall or to the exterior wall of the tube may be associated with advantages in relation to the stability of such a connection. In this way, bending moments or shear forces may be prevented.

Connection elements that are separable, for example, may be attached to an outside or exterior wall or interior wall or -side of a tube so as to be positive locking or so as to have a precise fit.

The connection element or the connection may comprise two identical formed pieces that are made from fiber reinforced composite materials, such as for example carbon-fiber reinforced plastic, or from metal (sheet metal, furthermore milled). Taking into account manufacturing tolerances, connection may take place both on the outside and on the inside of the tube or bar element. The formed pieces may have a contour that allows for continuous production, similar to that of a profile.

According to a further embodiment, the junction element, of which there is at least one, is shaped to engage the transition region or one end of the connection element of the at least one bar element. This means that an attachment element or junction element, and in particular, its shape, matches the shape of the transition region of a bar element. Matching the shape may allow one to produce a connection having as precise a fit as allowable or to produce a positive-locking connection. In this way, bending moments and inhomogeneities may be prevented.

Due to the precisely fitting shape, a junction element is in direct contact with a transition region so that during installation, any stress, for example, resulting from pressure, may be prevented. That is, if two elements, in particular, a junction element and a transition region of a bar element or of a connection element were not of a precise fit, during installation, pressure may press the component into the corresponding shape, as a result of which stress could arise.

According to a further embodiment, the at least one junction element comprises an attachment face. Furthermore, the junction element comprises a reference face, wherein the reference face and the attachment element are connected in such a way that a spatial direction for a connectable bar element may be specified. For example, a spatial direction for the bar element may be defined by the angle between the attachment element and the reference face.

For example, the attachment face and the reference face may be web-like or in the shape of sheet metal. The sheet metal parts may be arranged at various angles in relation to each other. The reference face may be attached to an installation face such as for example a rib, a stringer or a frame element.

Therefore the reference face may extend substantially parallel to the installation face. Due to the angle between the reference face and the attachment face, the attachment face may be arranged at an angle in relation to the installation face. The shape of the attachment face may match the shape of a transition region or of a connection element such that during installation, for example, a beak-shaped end region, of a corresponding connection element or of a transition region, the angle between the connection element or tube of a bar element corresponds to the angle between the attachment face and the reference face.

In this way special connection points or junction points with angles for support structures with a regular design, may be produced. These support structures may be shaped in the manner of a framework. By the angle between the attachment face and the reference face, or by the corresponding angle between the bar element and the reference face, or the bar element and the installation face, optimised force paths may consequently be achieved. However, an attachment face may also be an integral part of a fuselage element, a rib, a stringer or a frame element.

For example, if the junction element is an L-shaped support, the angle between the attachment face and the reference face is 90°.

Various wall thicknesses in the case of carbon-fiber reinforced plastic construction, may be produced with only a few, e.g. two, laying moulds and variation in the wall strength. Variation in the wall strength may take place by varying the number of layers, and all imaginable load magnitudes may be covered by varying the thickness of the material or the number of layers.

Apart from comprising carbon-fiber reinforced plastic, a junction element may also be made from aluminium or steel or any other material common in aircraft construction.

According to a further embodiment, the junction element is an airframe element. The term "airframe element" refers to, for example, spars, stringers, frame elements or ribs. Airframe elements provide strength to the frame of an aircraft. Airframe elements may also serve to accommodate forces, for example forces that are introduced by add-on units. Examples of add-on units include a vertical tail unit or a wing or support structure of a vertical tail unit.

In the case of airframe elements that are designed as junction elements there is no need to use separate junction elements.

Many improvements have been described with reference to the support structure. These designs also apply to the connection element, to the junction element, to the wing, and to the method for transmitting forces between a bar element and a junction element.

BRIEF DESCRIPTION OF THE FIGURES

FIG. 12 shows a perspective lateral view of a wing with a support structure according to an embodiment.

FIG. 13 shows the perspective lateral view of FIG. 12 without the interior skin.

FIG. 14 shows a further perspective cross-sectional view of a wing comprising a support structure according to an embodiment.

FIG. 15 shows a partial frontal view of a section of a vertical tail unit according to an embodiment.

DETAILED DESCRIPTION

Figure 1:
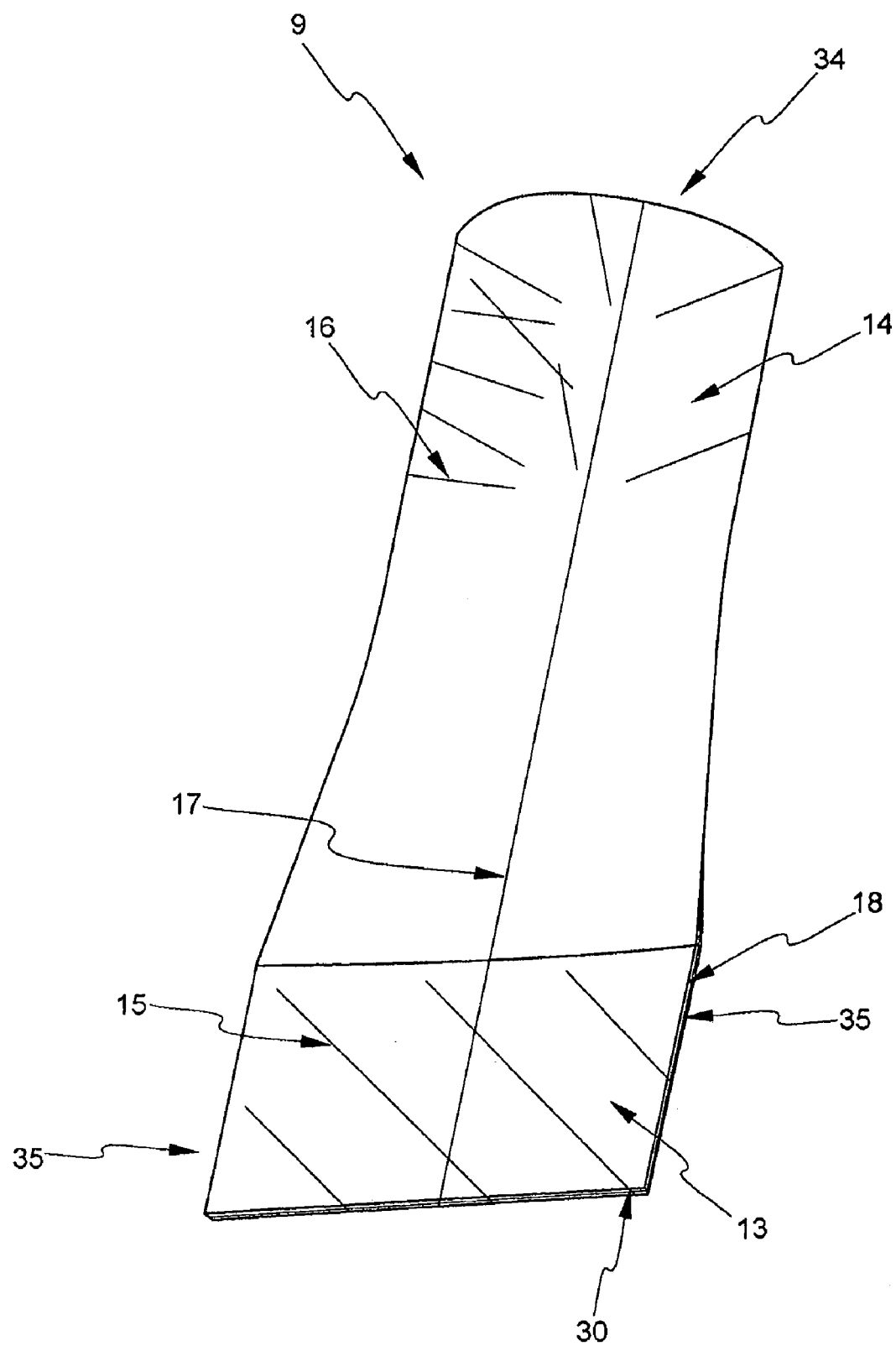
FIG. 1 shows a top view of a connection element according to an embodiment.

The examples described and drawings rendered are illustrative and are not to be read as limiting the scope of the invention as it is defined by the appended claims. The features shown in the drawings are not on scale. Same or similar features in different drawings are labelled with the same or similar reference signs.

FIG. 1 shows a top view of a connection element 9. The connection element 9 forms the transition from a round cross section 34 to a narrow rectangular cross section 30. On its round end 34 or on its round cross section 34, which may receive a tube, the connection element 9 comprises an aperture for accommodating a tube. In the non-fastened state, an inserted tube or bar element may be slid along the accommodation region or attachment region 14. As an alternative, the accommodation region 14 may also be inserted into a tube. In the non-fastened state, a tube inserted into the attachment region 14 may be slid along the center line 17 or may be rotated on the center line 17. By sliding the tube in the attachment region 14, tolerance compensation such as an overall length, which is formed from the length of the connection element 9 along the center line 17 and from the length of an inserted tube, may be varied as required.

On the attachment end 14, which may be tubular, blind rivets may be used for fastening. By rivets, very substantial loads may be accommodated by the connection element 9.

Preferably, the rivets are affixed in designated riveting regions 16. The transition between the round end 34 and the rectangular end 30 of the connection element is continuous. On the rectangular end 30 of the connection element 9, a flat region 13 is formed.

This flat or sheet-like region 13 serves to accommodate or affix connection elements, such as for example, rivets or screws. As an alternative, this region, for example; the corresponding region of the face within the gap 35, may also be used as an adhesive face in order to bond the connection piece to a junction element. To this effect, the junction element is inserted into the gap 35.

In this arrangement, the sheet-like region 13 is beak-shaped. The gap 35 may be elongated or dilated somewhat in order to accommodate a junction element. In this way, insertion of the junction element into the gap is facilitated. Increasing the gap clearance results in a restoring force. When the junction element is located in the desired position, it is fastened by the sheet-like regions 13 that work against the aperture of the gap.

The extensive sheet-like shape 13 provides space for rivets. Riveting takes place in designated regions 15 that take into account that, with riveting, the load on the material at the flat end 13 does not become excessive. The gap 35 together with the longer edge of the rectangular cross section 30 provides a symmetry plane for the connection element 9. According to this plane, the connection element 9 may be separated.

Separation results in two identical shell-shaped formed pieces. These formed pieces may be produced from a fiber reinforced composite material as well as from metal, for example, from a piece of sheet metal. By varying the wall thickness 18, the connection element or the tubular connection 9 may transfer different load magnitudes or loads. To this effect, for example, the number of layers in the production using carbon-fiber reinforced plastic (fiber reinforced composite material) is changed. For example, with two laying moulds and a variation in the wall thickness by changing the number of layers, a host of different load magnitudes may be transferred.

The symmetric design of the connection element 9 or of the formed part, i.e., the upper and the lower shell, may allow force transmission free of any moments, between the round cross section 34 and the rectangular cross section 30 along the center line 17. In this arrangement, the center line 17 connects the centers or centers of mass of the round cross-sectional area 34 and the rectangular cross section 30.

A junction element, such as for example, a piece of sheet metal, that has a shape that corresponds to the rectangular cross section 30, may be inserted into the gap 35. In the inserted state, the connection element 9 or the top or bottom 9 of the formed part may be attached to the junction element by rivets attached to the flat region 13. Centric introduction of force along the center line 17 into the junction element thus becomes allowable.

The formed part may be rotated on the center line 17. The formed part or the shell parts may be affixed to each end of a corresponding tube. By rotating the formed part on the center line 17, the planes delimited by the sheet-like side 13 of two formed parts that are opposite each other, i.e. that are located respectively at the other end of the tube, may be rotated in relation to each other. In this way, deviations in the angles of the junction elements, may be corrected.

Figure 2:
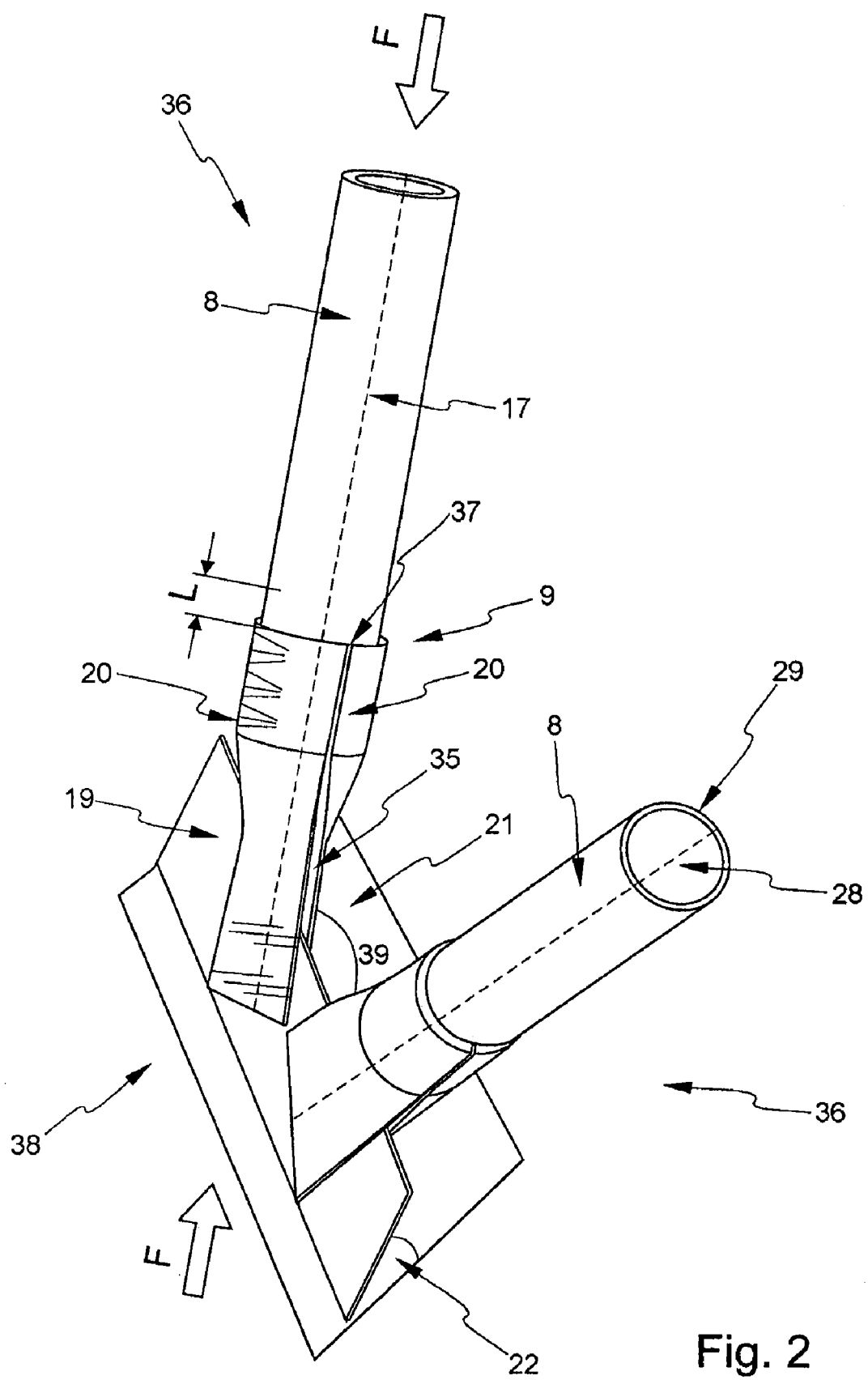
FIG. 2 shows a diagrammatic arrangement of two bar elements on a junction element according to an embodiment.

FIG. 2 shows the arrangement of two bar elements 36 on a junction element 38. A bar element 36 comprises a tubular element 8. The connection element 9 is composed of two formed parts 20 and is attached to one end of the tubular element 8. The two formed pieces 20 correspond to the connection element 9 that allow for a transition region from a round cross section to a rectangular cross section, as depicted in the figure. Other shapes besides rectangular cross section may be used.

The term, "Substantially tubular" as used in the specification, includes shapes from circular, square, hexagonal or rectangular. In one example, the transition region comprises a first end with a first cross-sectional shape and a second end with a second cross-sectional shape, with the first and the second cross-sectional shapes being different; and the second end of the transition region is shaped as a symmetric flattening of a tube.

For the transition, the gap 35 is continued through the entire connection element, as a result of which the two shells 20 arise. The two shells 20 are identical formed pieces of the connection element 9. By the space 37, a situation where the interior of the formed pieces 20 conforms to the outside of the tubular element 8 in a positive-locking connection or in a connection having a precise fit, may be achieved. The formed parts 20 are riveted to the end region of the tubular element 8 by rivets, in particular, by blind rivets.

The diagram shows the introduction of a force F onto the cross-sectional areas of the tubular element 8, onto the round or circular, in particular tubular, cross-sectional area of the tube 8. Due to the axially symmetric design of the tubular element 8, the force F acts along a longitudinal axis on an imaginary center line 17 or symmetry axis of the tubular element 8. In effect, the force propagation takes place in the wall of the tubular element 8. Due to dimensioning with the largest allowable diameter, a low fineness ratio of this tubular element 8 may be achieved, i.e. the parameter $\lambda$ has a low value. In the region of the connection element 9; the center line 17 extends in the symmetry plane of the connection element 9.

The two formed parts 20, which are identical in shape, of the connection piece 9, comprise a symmetry plane along the gap 37 and 35. The center line 17 also extends through the symmetry plane of the connection element 9. Due to the symmetric design of both the tubular element and the connection element 9, equal forces act on both sides of the symmetry plane of the connection element 9 so that no moments arise.

The force path also extends symmetrically in relation to the center line 17. The center line 17 is continued in the attachment element 19 of the junction element 38, which attachment element 19 is enclosed by the two formed parts 20 of the connection element 9. Consequently, a force is introduced, symmetrically and free of any moments, into the attachment element 19 of the junction element 38. The two bar elements 36 are arranged at an angle 39 in relation to each other, within an area delimited by the sheetlike, flat or rectangular attachment element 19. By this angle, bar constructions or framework constructions for accommodating forces in certain directions may be generated.

By rivets (not shown in FIG. 2), the sheet-like end regions of the formed parts 20 of the connection element 9 are connected to the attachment sheet metal 19. The attachment sheet metal 19 in turn is arranged at an angle 22 in relation to a bottom plate 21. By the angle 22, in turn, an angle of the bar elements 36 in relation to the bottom area 21 may be set. For example, the junction element 38 may be a framework component of an airframe. In this way, for example, forces that are transferred from an aircraft add-on part may be transferred into or out of an airframe structure in a targeted way.

The completely symmetrical design prevents an eccentric connection, as a result of which no additional loads due to bending are generated. The effective line of the transferred force F extends through the center plane of the junction point 38 or of the attachment element 19, the center line of the formed pieces 20 and the center line 17 of the tubular elements 8. By sliding the tubular element 8 or the attachment element 19 in the formed pieces 20 by the distance L, tolerance compensation and longitudinal compensation may be achieved.

By the bottom plate 21, the junction element 38 may, for example, be affixed to a frame element. The junction element 38 may, however, also be an integral part of a framework component made in one piece.

The tubular element 8 has a round cross section. In this arrangement, the interior region 28 is substantially hollow, with the stability being determined among other things by the wall thickness 29 of the tube 8 and by the tubular diameter.

Figure 3:
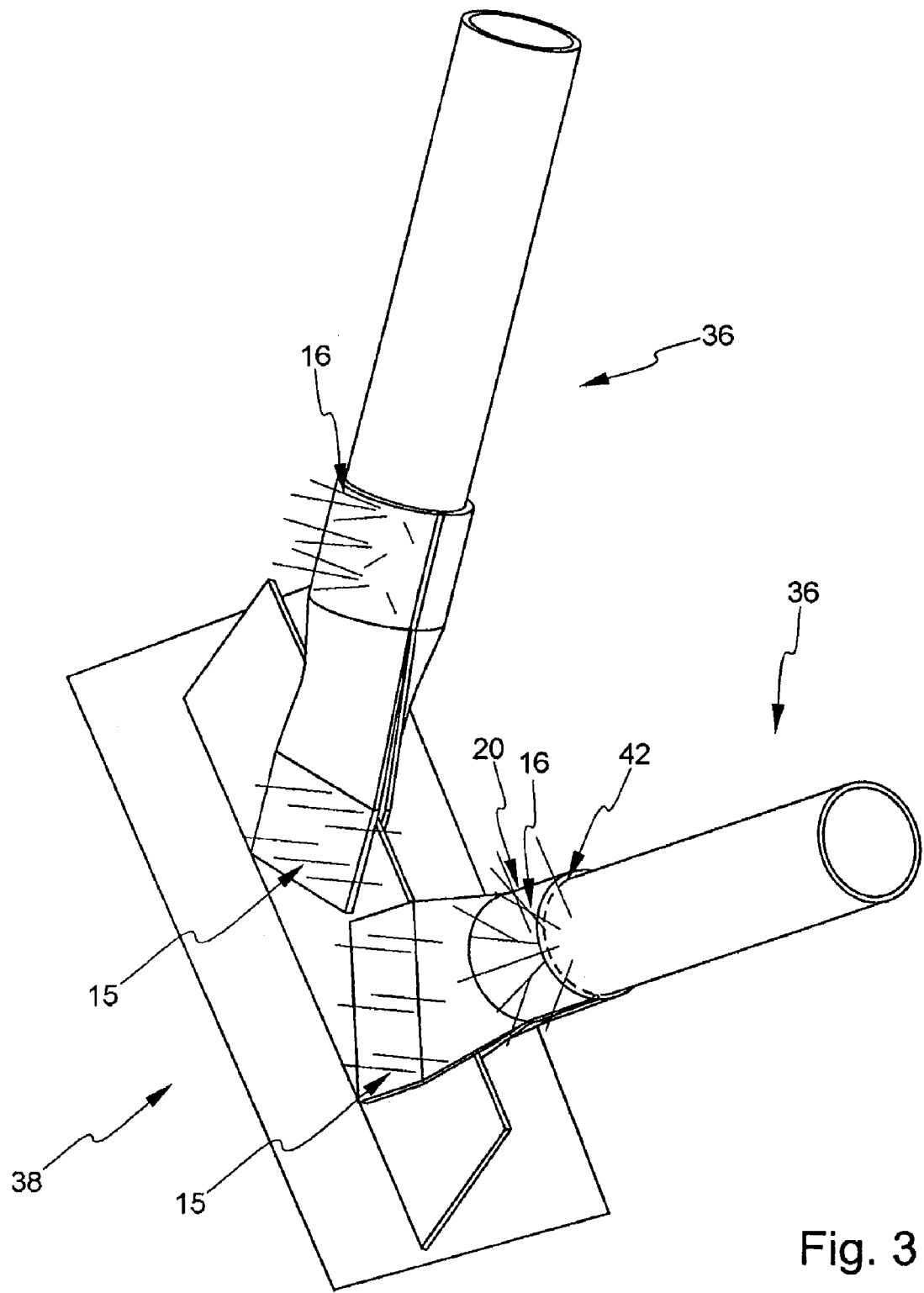
FIG. 3 shows a further diagrammatic arrangement of two bar elements on a junction element according to an embodiment.

FIG. 3 shows a further diagrammatic arrangement of two bar elements 36 on a junction element 38. The diagram shows the wall thickness 42 of the connection element or of the formed part 20. The material thickness 42 or the number of layers 42 in the case of production with a composite material have an influence on the load bearing ability of the formed part 20. The thicker the wall thickness, the more load bearing ability the connection element 9 has. Examples of allowable rivet attachment positions are indicated by the riveting center lines 15, 16.

Figure 4:
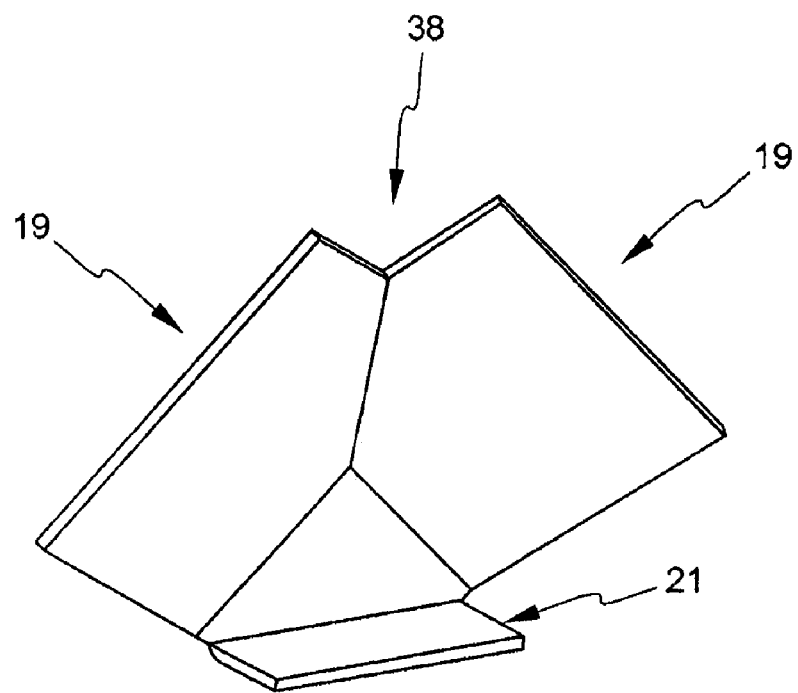
FIG. 4 shows a diagrammatic view of a junction element according to an embodiment.

FIG. 4 shows a diagrammatic view of a junction element 38 according to an embodiment. The junction element shown in FIG. 4 comprises a bottom face element 21 and two attachment elements 19, which are attached to the bottom plate by an intermediate piece. By the position of the attachment elements 19 in relation to each other and the position in relation to the bottom face element 21, a spatial direction of the bar elements to be connected may be determined. The position and spatial direction are determined by the angles of the surfaces 19, 21 among each other.

Figure 5:
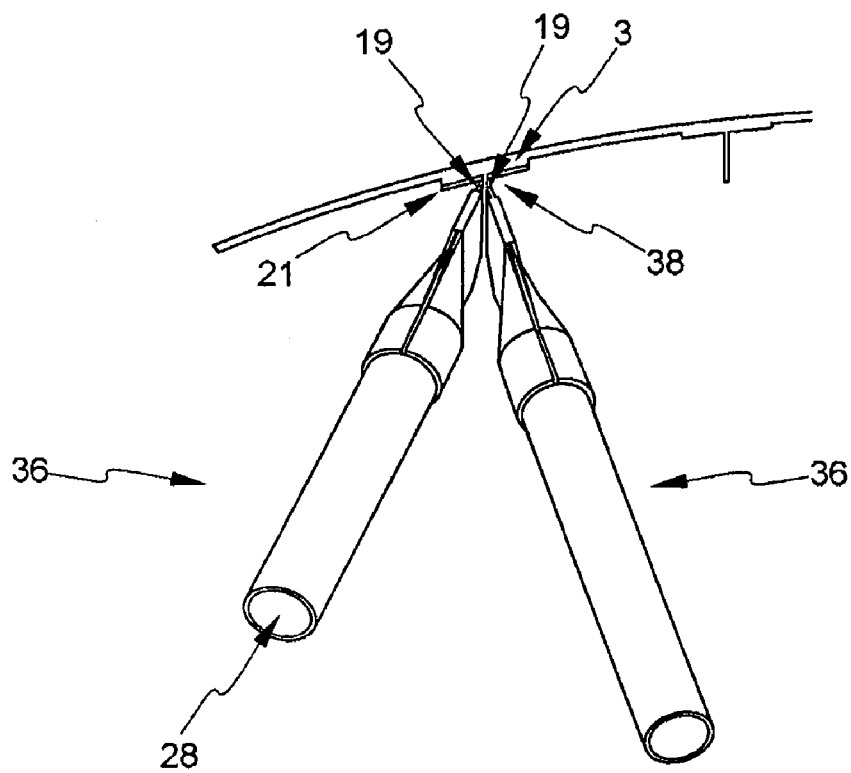
FIG. 5 shows a further diagrammatic arrangement of two bar elements on a junction element according to an embodiment.

FIG. 5 shows a further diagrammatic arrangement of two bar elements on a junction element according to an embodiment. The bottom element 21 adjoins the frame component 3 in a planar manner. In this arrangement, the bottom face 21 may serve as an attachment face. It may, for example, accommodate rivets or screws in order to establish a connection to the framework component 3. However, the bottom surface 21, for example, may also be bonded to the framework component 3.

The two bar elements 36 are attached to the attachment elements 19. The angle at which the bar elements are arranged between the bottom face 21 and the bar element 36 may be determined by the angles between the attachment element 19 and the bottom plate 21 or between the attachment elements 19 among each other.

Figure 6:
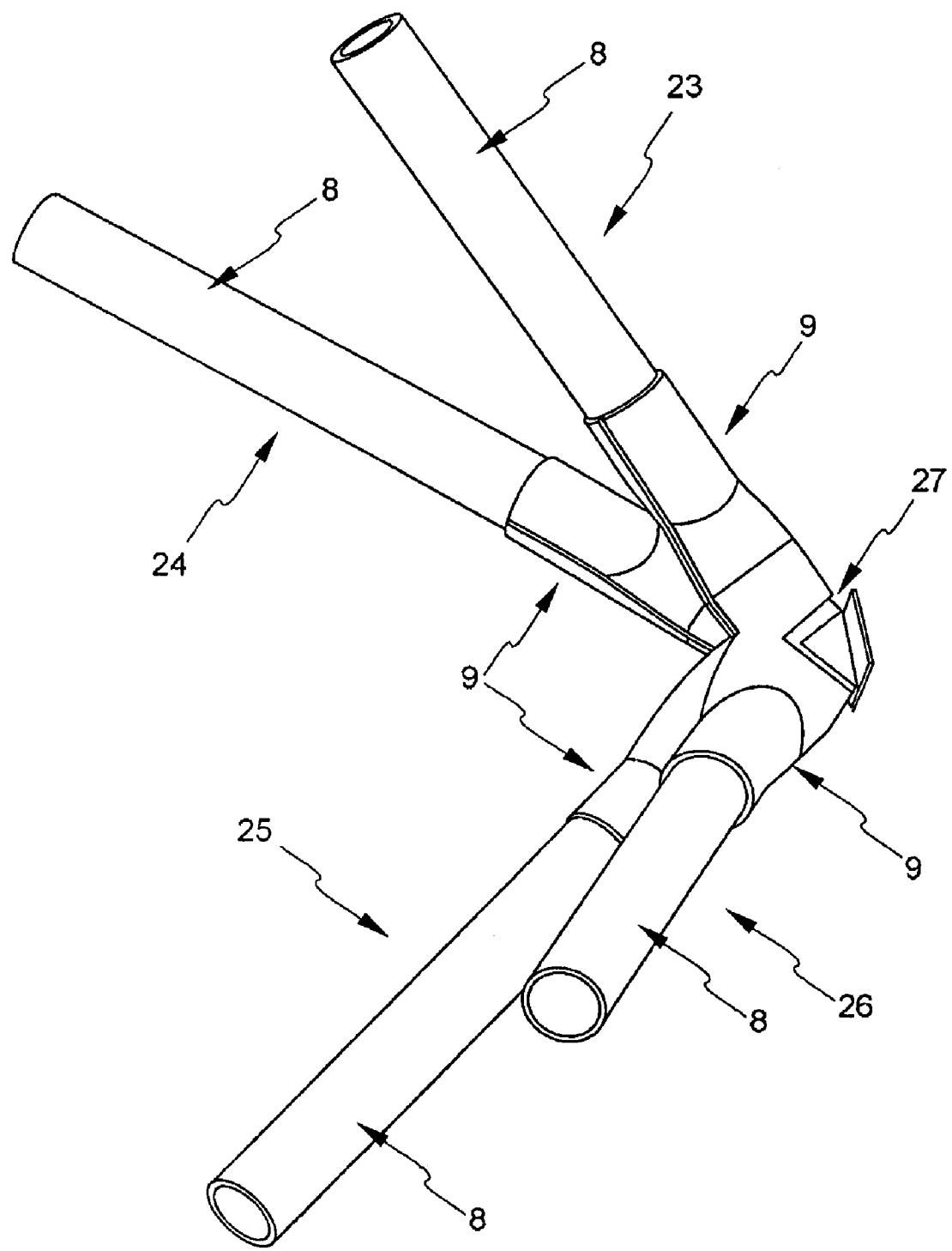
FIG. 6 shows a diagrammatic arrangement of four bar elements on a junction element according to an embodiment.

FIG. 6 shows four bar elements 23, 24, 25 and 26 that are arranged on a junction element 27. The junction element 27 again comprises a bottom plate. By the arrangement shown in FIG. 3, a force that acts on the bottom plate of the junction element 27 to the four supports or bar elements 23, 24, 25 and 26, may be distributed. Furthermore, a force may be introduced from the supports into the junction element 27.

The bar elements 23, 24, 25, 26 again comprise tubular elements 8 and connection elements 9. The connection elements 9 are attached to one end of the tubular element 8. The other end, i.e. the opposite end, is shown open in FIG. 6. However, for example, further tubular connections, connection elements, bar elements 23, 24, 25, 26 or junction elements may be connected to the respective open end of the tubular element 8 of the bar elements 23, 24, 25, and 26. Spatial frameworks from the individual components of bar element 23, 24, 25, 26, tubular element 8, connection element 9 and junction element may be arranged. The angles of the individual bar elements among each other are, for example, dependent on the loads to be accommodated by the bar elements.

Figure 7:
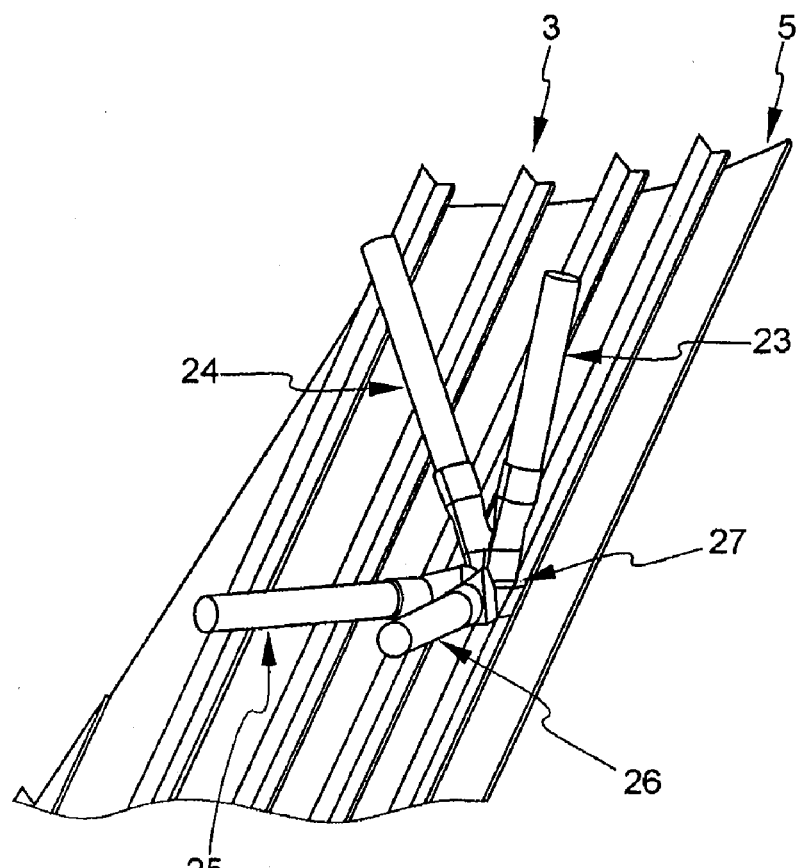
FIG. 7 shows a diagrammatic arrangement of a junction element comprising four bar elements on a frame element according to an embodiment.

FIG. 7 shows the arrangement of FIG. 6, arranged on a frame element 3. FIG. 4 shows an L-support element 3 that serves as a basis for accommodating the junction element 27. The frame element 3 reinforces the lateral face 5.

Figure 8:
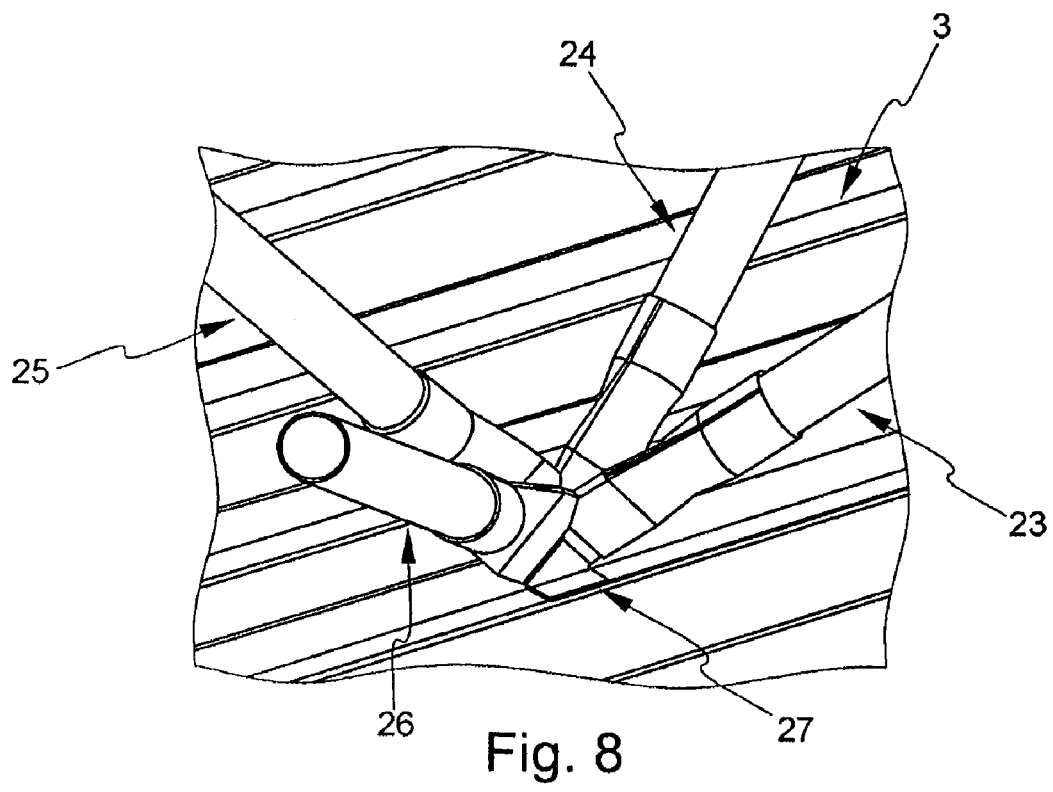
FIG. 8 shows an enlarged diagrammatic arrangement of a junction element comprising four bar elements on a frame element according to an embodiment.

FIG. 8 shows an enlarged diagrammatic arrangement of a junction element 27 comprising four bar elements 23, 24, 25, 26 on a frame element 3. The diagram shows that the bottom face of the junction element 27 rests flat against a bottom face of the L-shaped frame element 3.

Figure 9:
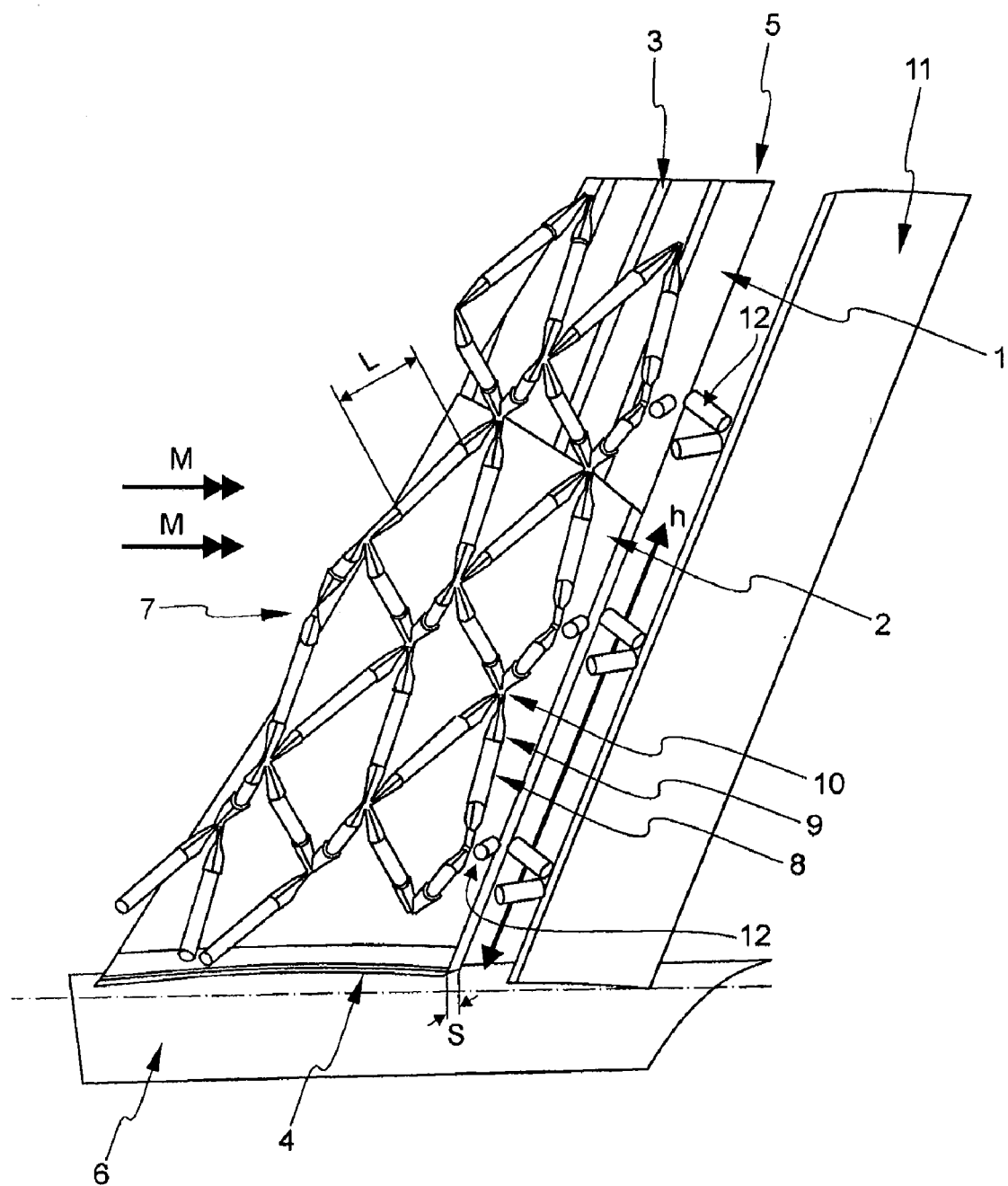
FIG. 9 shows a perspective cross section of a wing that comprises a support structure according to an embodiment.

FIG. 9 shows a cross section of an aircraft wing that comprises a support structure 7 according to an embodiment. The diagram shows in particular a rear (when seen from the direction of the viewer) lateral face 5 of a center box of an aircraft wing. The shape and orientation of the lateral face 5 show that it is a lateral face 5 of a center box for the vertical tail unit of an aircraft. The lateral face 5 comprises a rear (when seen from the direction of the viewer) exterior skin 1 as well as a front interior skin 2. The exterior skin 1 and the interior skin 2 are spaced apart from each other at a distance s. Between the exterior skin 1 and the interior skin 2, several spacers, framework components or U-profiles 3 are arranged, whose respective webs comprise a height s. Consequently, the spacers 3 space the interior skin 2 apart from the exterior skin 1, which skins are riveted to the spacers by way of blind rivets (not shown in the diagram). While attachment with the use of blind rivets may be particularly advantageous, the exterior skin 1 and the exterior skin 2 may also be attached to the spacers in some other manner, for example, by adhesive connections.

As is further shown in FIG. 9, the interior skin 2 does not extend over the full height of the exterior skin 1. Instead, the interior skin 2 extends only over the height h, in which exposure to moments as a result of an air load is particularly high, as is indicated by the moment-arrow symbols M. Exposure to considerable moments applies in particular to the root region near the fuselage connection 4 of the center box so that it is sufficient to arrange the interior skin 2 only in this region, which, depending on the type and size of the aircraft, may account for 10% to 50% of the entire wing length.

FIG. 9 shows that, for further force transfer or accommodation of forces, junction points 10 or junction elements 10 are arranged on the respective spacers or framework profiles 3. Together with the connection element 9 and the tubular elements 8 said junction points 10 or junction elements 10 form a support structure 7 that is designed in the manner of a framework. By the structure 7, the moments are divided into tensile forces and pressure forces along the bars, and are transferred to the lateral face of the vertical tail unit, which lateral face (not visible in FIG. 9) is opposite the lateral surface 5. Similarly, part of the forces are fed to the connection region 4, in particular to the aircraft fuselage 6, in the form of pressure forces or tensile forces.

Advantageously, dividing the moments or forces acting on the vertical tail unit not only takes place by way of the exterior skin or the brace components 3; instead these forces are also transferred by the entire support structure 7. In an advantageous manner, a lateral face 5 or framework components for stiffening a wing or vertical tail unit 3 may be designed such that the dimensions are smaller.

Since the great moment loads occur in the root region near the fuselage connection 4 of the center box, advantageously, bar elements 8 or connection elements 9 that are produced so as to have particularly good load bearing characteristics may be used in a lower region, i.e. in a region of the support structure 7 that is near the aircraft fuselage 6. Both the interior skin 2 and the exterior skin 1 may transfer forces and moments to the fuselage 6 by using of a fitting or angle in the region of the fuselage edge 4.

The diagram shows that due to the connection of the bar elements 8, junction points form both on the lateral face 5 and on the side opposite the lateral face 5. At these locations, the opposite lateral face would be arranged, which analogously to the lateral face 5 accommodates forces acting in the opposite direction.

Different pressure loads onto the two lateral surfaces 5 may, for example, be due to the aircraft, of which only a partial region of the fuselage 6 is shown in the diagram, flying in a curve. For flying in a curve, the rudder or yaw rudder 11 would be moved both into the drawing plane and out of the drawing plane. Movement of the rudder 11 is controlled by control face fittings 12 (for example, Ruderbeschläge). By changing the position of the rudder 11, pressure forces or suction forces are generated in a way known from a vertical tail unit. By the support structure, such forces may be distributed, and center boxes of wings may be designed so as to be stable. A support structure 7 according to the arrangement shown in FIG. 4 not only allows a stable but also a lightweight design of a wing, such as a vertical tail unit of an aircraft.

By the stated support structure 7, very considerable forces due to a low fineness ratio of the bar elements and a large number of rivets, may be transmitted. Furthermore, to fit a support structure in a center box, corresponding tolerance compensation may take place by way of the depth to which a tubular element reaches into a connection element. By way of restraining effects a reduction in the effective buckling length of bar elements may be achieved. Furthermore, stress concentration may be prevented.

In an Airbus A380, examples of frame elements 3 include the SLW center box ribs 1-7. There are, however, a plurality of various applications in addition to this. An application of a support structure 7 is not limited to center boxes of aircraft wings. Instead, a plurality of various applications may be stated. For example, floor substructures (for example, Fussbodenunterbaukonstruktionen), in particular for aircraft floors, may be formed by a support structure.

Figure 10:
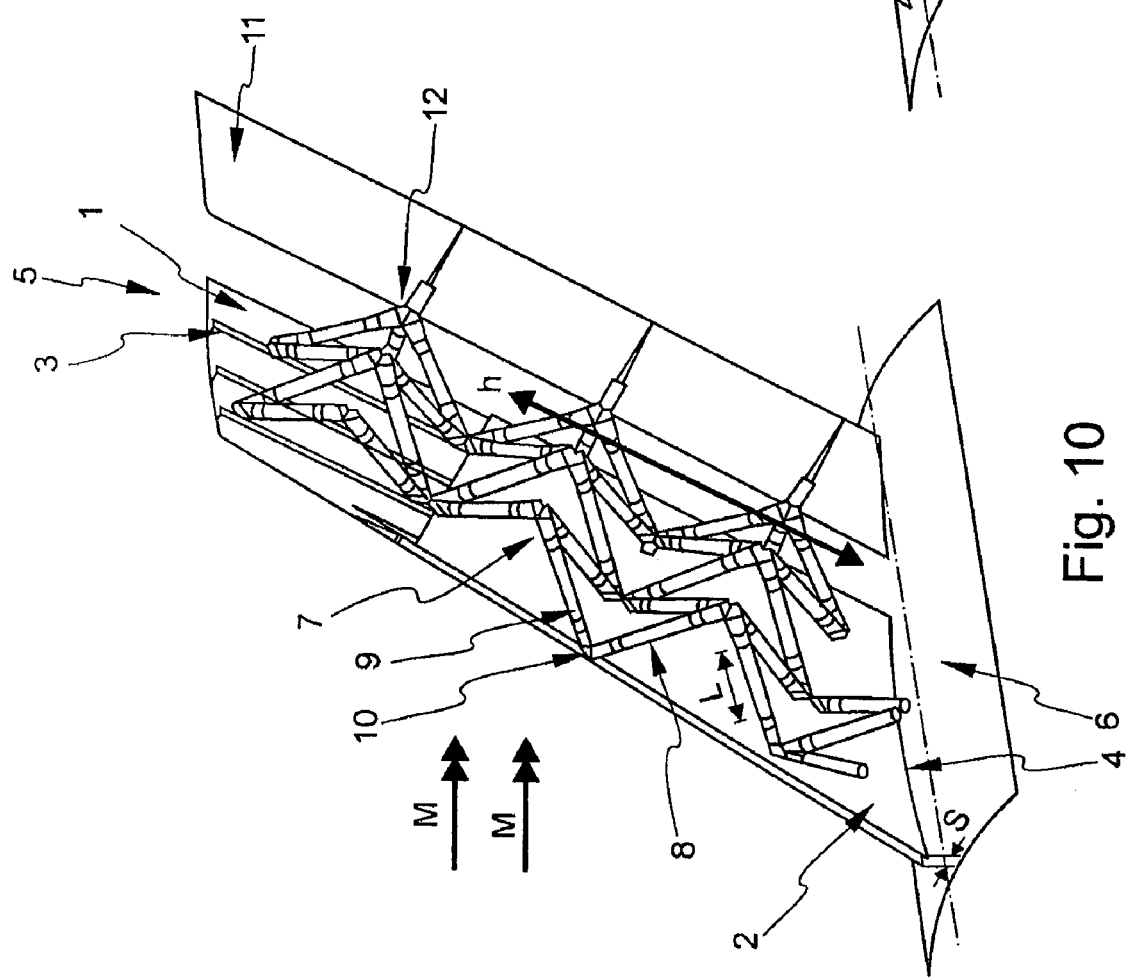
FIG. 10 shows a further perspective cross section of a wing comprising a support structure according to an embodiment.

FIG. 10 shows a further perspective cross section of a wing comprising a support structure 7. The selected perspective shows that the end points of the tubes 8, which also comprise connection elements 9, form a plane in relation to the interior skin 2 and/or the exterior skin 1. With the use of corresponding junction elements 10, a lateral face 5 may be affixed to these junction points, if applicable with an interior skin 2 and an exterior skin 1.

Figure 11:
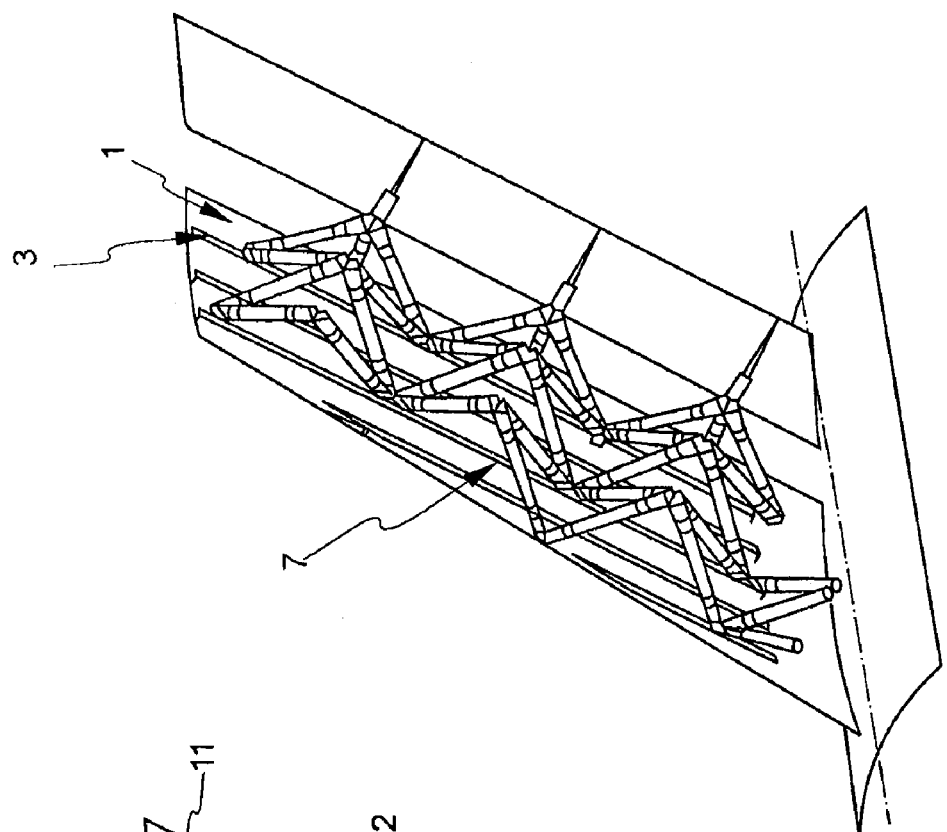
FIG. 11 shows the perspective cross section of FIG. 10 without interior skin.

FIG. 11 shows the perspective cross section of FIG. 10 without the interior skin. The diagram shows that the U-profiles 3 also extend along the region that in FIG. 10 is hidden by the interior skin 2.

FIGS. 12 to 14 show further perspective views of a wing, in particular of a vertical tail unit. The respective diagrams show the design of a vertical tail unit and of a control surface or rudder. The diagram shows the manner in which the rudder 11 is held to the vertical tail unit by the control surface fittings 12 (for example, Ruderbeschläge). As a result of the rudder 11, additional weight arises that has to be borne by the support structure 7, the interior skin 2 and the exterior skin 1 as well as by the fitting 4.

FIG. 15 shows a diagrammatic partial front view of a section of a vertical tail unit of an aircraft. Two lateral faces 5 provide the vertical tail unit with a flat structure which lateral faces extend into the drawing plane. The two lateral faces 5 form a shell around the framework 7. With the aircraft moving out of the drawing plane, air may flow past the lateral faces 5. FIG. 15 shows two lateral faces 5 that form an exterior skin 1. At the junction points 10, the lateral faces 5 are connected to the framework 7. In this way, the junction points 10 determine the shape of the vertical tail unit. The framework 7 is covered by the lateral faces 5 such that the framework 7 may be used as framing for the lateral faces 5. The framework 7 supports the lateral faces 5.

FIG. 15 shows two individual lateral faces 5 that are arranged on the sides of the framework 7. However, the exterior skin 1 may also be designed as a continuous element, wherein the upper region of the vertical tail unit, which region, in the diagram, is shown to be open, is closed and is also covered by the exterior skin.

Between the two faces 5, substantially a hollow space is formed that comprises the framework 7. A lightweight vertical tail unit may be designed. Forces that act on the lateral faces 5 in the direction of the hollow space are transferred to the fuselage 6 of the aircraft in a straight line, by way of the framework 7, in the interior of the vertical tail unit. In order to introduce the forces that have been transferred from the lateral faces 5 by the framework 7 to the fuselage of the aircraft, both the framework 7 and the lateral surfaces 5 are connected to the fuselage 6 of the aircraft. The connection may, for example, be established by riveted connections (not shown in FIG. 15).

However, the framework 7 may be connected only to the lateral faces 5, without the framework establishing direct contact with the fuselage 6. In this case, the force introduction into the fuselage takes place by way of the framework 7 and the lateral face 5.

Figure 16:
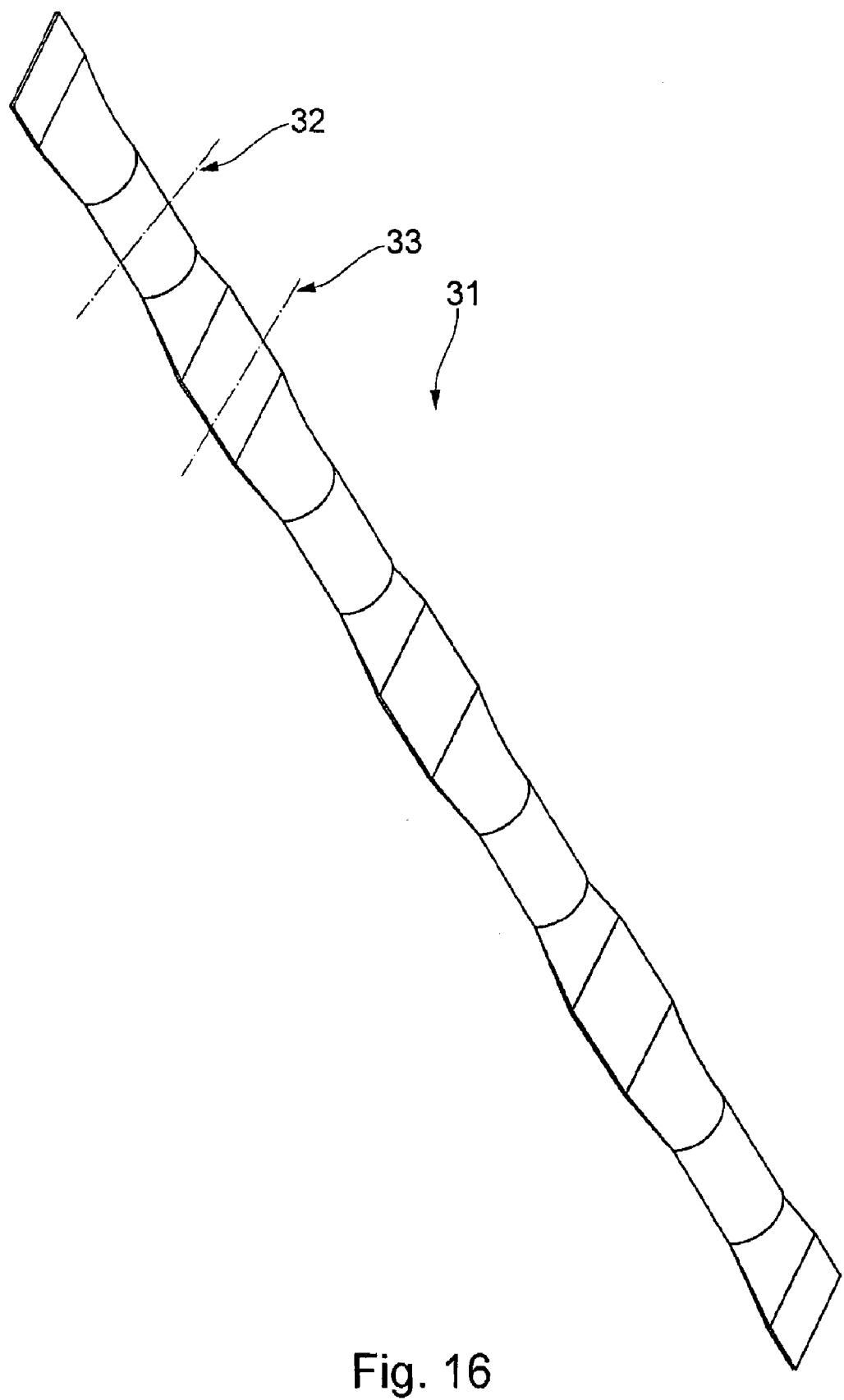
FIG. 16 shows a bottom view of a tubular profile according to an embodiment.

FIG. 16 shows a bottom view of a tubular profile according to an embodiment. The tubular profile 31, pressed sheet metal part 31, carbon-fiber reinforced or glass-fiber reinforced interlaid fabric 31, shown in FIG. 16, is the semifinished product 31 from which the connection elements 9, in particular the formed pieces 20, may be produced. The semifinished product 31 is a profile that may be obtained from a tube by centrally cutting open the tube. At equidistant spacing, as described in more detail in FIG. 19, flattening is performed. The tubular element shown in the diagram already has a shell shape.

The semifinished product 31 comprises a long side and a short side. The short side determines the width of the semifinished product 31. In the flattened regions 41, the semifinished product 31 is wider than in the tubular or semi-tubular region 40. The dashed lines 32 and 33 show potential locations of separation. These locations of separation are repeated alternately at equal spacings. If the semifinished product is separated at the locations of separation 32 and 33, the result is a formed piece of a connection element 9. From the semifinished product 31 shown in FIG. 16, eight formed pieces for the connection elements 9 may be obtained.

Figure 17:
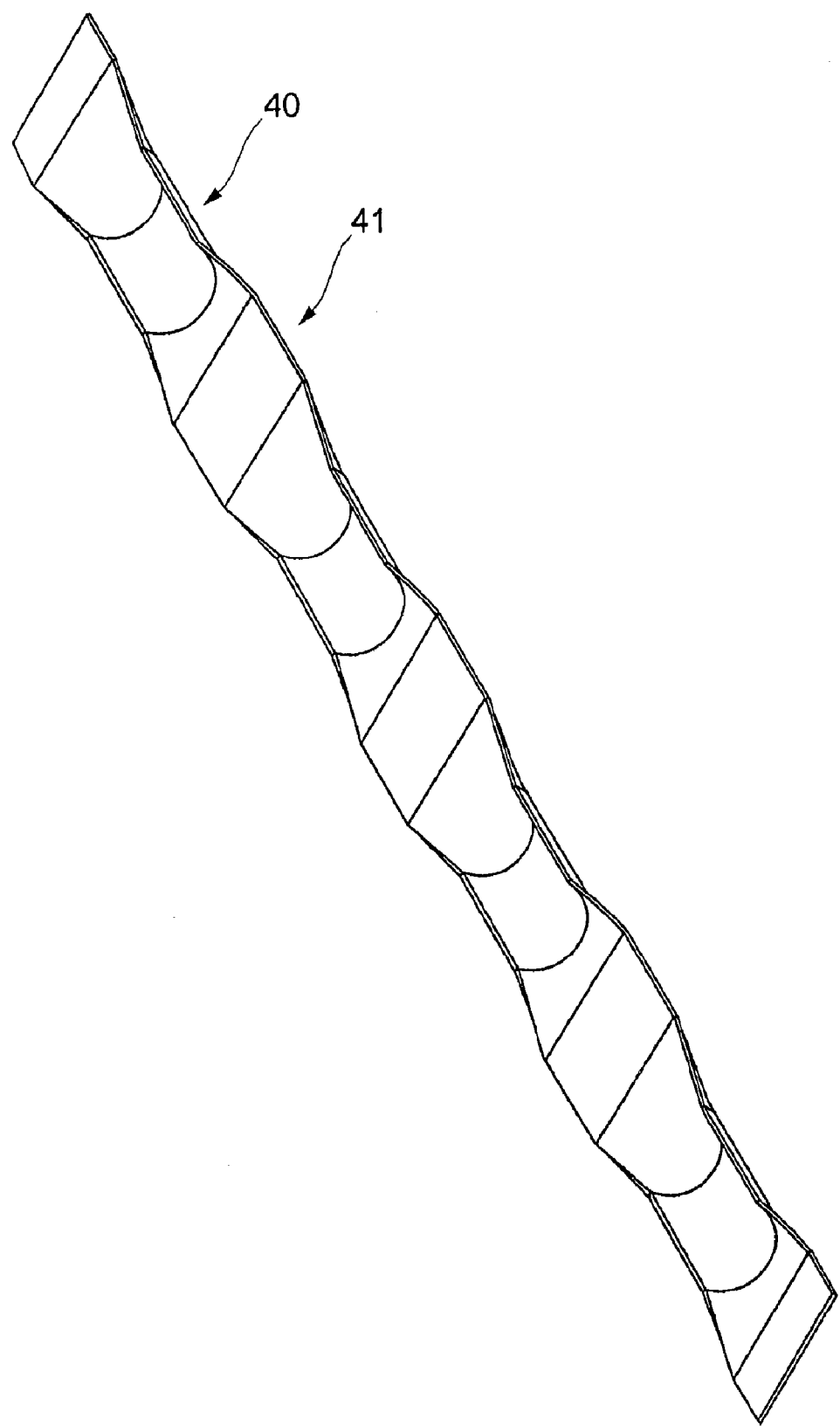
FIG. 17 shows a top view of a tubular profile according to an embodiment.

FIG. 17 shows a top view of the semifinished product 31 of FIG. 16. The shell-like design of the cross section shows the formed parts 20 of a multipart design of the connection element 9. These formed parts 20, too, feature the transition between the tubular or semi-tubular end 40 and the flat end 41. By separation, as described analogously in FIG. 16, the formed parts 20 may be produced. The method for producing the formed parts 20 is described in FIG. 19.

Figure 18:
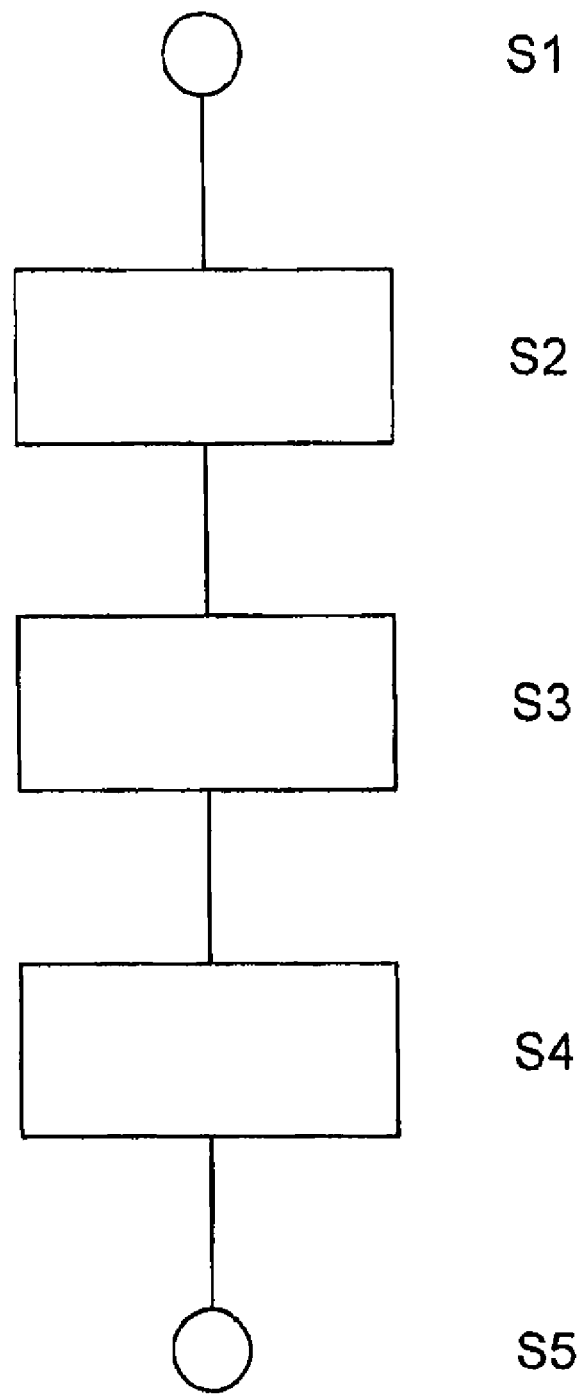
FIG. 18 shows a flow diagram of a method for supporting according to an embodiment.

FIG. 18 explains a method for transmitting forces between a bar element and a junction element by a connection element. The method involves steps S1-S5. In the implementation of the method, after leaving the quiescent state S1, in step S2, a bar element is connected to a first end of the basic body of a connection element. In a next step S3, on a second end of the basic body of the connection element, a junction element is connected so as to at least partly overlap. The sequence of steps S2 and S3 may also be the other way round if desired. In a step S4, finally, a force is centrically transmitted between the bar element and the junction element so that no moments arise. After completion of the transmission of the force, in step S5, a quiescent state is reached again.

Figure 19:
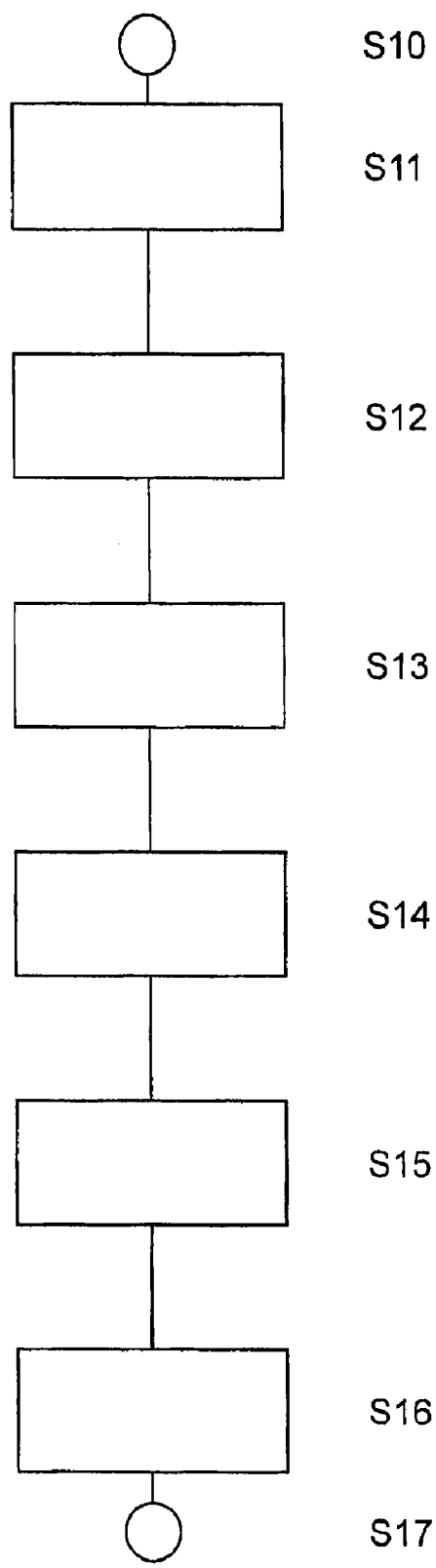
FIG. 19 shows a method for producing a connection element according to an embodiment.

FIG. 19 shows a flow chart for a method for producing a connection element. In this arrangement, the method first involves step S11, in which a tube is provided. In step S12, part of the tube is then symmetrically flatted at regular spacings. The tube is deformed in such a way that after step S12, which may be repeated as desired, a tubular profile with tubular regions and flattened regions is obtained.

Step S13 alternately involves equidistant separation or cutting off of connection elements from/of the tubular profile. Separation or cutting off takes place both on the flattened positions and on the tubular positions. Cutting off takes place substantially perpendicularly to an axis that is defined by the longitudinal direction of the tubular profile. In the following step S14, a connection element with a first end of round cross section and with a second end, which is flat, of a rectangular cross section is provided.

Finally, in step S15, an accommodation region is symmetrically milled in one plane in the flat end of the connection element so as to be substantially parallel in relation to the flat end. This accommodation region is used to accommodate a junction element. After this, the connection element is centrically divided (S16) in a plane parallel in relation to the flat end of the connection element. In this context, the term "centrically" relates to the diameter of the round end of the connection element, in one example.

When the end state S17 has been reached, at least one connection element or at least two symmetrical formed parts have been obtained.

The connection element formed parts may also be made from a composite material such as glass-fiber reinforced or carbon-fiber reinforced plastic. In the so-called laying process, either a positive mould or a negative mould of the profile is provided. Since in a connection element, interior dimensions that are as precise as allowable are to be achieved, the production method involving the positive mould is explained in more following detail below. The composite material is laid in layers of the desired thickness onto the positive mould. In order to prevent blisters from developing, the composite material is drawn onto the mould by using a vacuum. In order to increase the vacuum, an air-impermeable film is placed around the composite material.

In this way, a half-shell profile may be produced from which the individual half-shells may be separated.

As an alternative, the connection element may be made from sheet metal using a sheet metal pressing process or stretch-form process. To this effect, a correspondingly structured piece of sheet metal is placed onto a positive mould of the profile and is subjected to pressure, as a result of which the sheet metal assumes the shape of the profile. The method continues with the use of the half-shell profile as described above.

In addition it should be pointed out that "comprising" does not exclude other elements or steps, and "a" or "one" does not exclude a plural number. Furthermore, it should be pointed out that features or steps which have been described with reference to one of the above embodiments may also be used in combination with other features or steps of other embodiments described above. Reference signs in the claims are not to be interpreted as limitations.

Alternative combinations and variations of the examples provided will become apparent based on this disclosure. It is not possible to provide specific examples for all of the many possible combinations and variations of the embodiments described, but such combinations and variations may be claims that eventually issue.

What is claimed is:

1. An aircraft wing support structure, comprising:
   a plurality of bar elements, each of the bar elements comprising a tubular element;
   a junction element comprising a junction joined to a framework element of the aircraft wing support structure by a flat base portion and providing a plurality of attachment elements, each of the plurality of attachment elements extending from the base portion at an angle; and
   a plurality of connection elements, each of the connection elements comprising a first end and a second end, the first end of each of the connection elements comprises a first connector for connecting to a respective one of the plurality of bar elements, and the second end of the connection element comprises a second connector for overlappingly engaging with a respective one of the plurality of attachment elements of the junction element, such that a portion of the second end of each of the plurality of connection elements overlaps the respective one of the plurality of attachment elements of the junction element, such that a spatial direction of each of the plurality of connection elements is defined by the angles defined by the attachment elements and the base portion of the junction element; and the first end of each of the connection elements has a first cross-sectional shape, and the second end of the connection elements has a second cross-sectional shape, wherein the first cross-sectional shape is different from the second cross-sectional shape, the second cross-sectional shape comprising a flattened tubular shape; and the connection elements, the first end of the connection elements and the second end of the connection elements are shaped such that, when the second end of the connection elements is overlappingly joined to the respective one of the plurality of attachment elements of the junction element and to a respective one of the plurality of bar elements, a force transmitted by the connection elements is centrically transmitted between each of the bar elements and the junction element; and
   wherein each of the plurality of the bar elements, the junction element and each of the connection elements are separate parts, and the tubular element of each of the bar elements comprises a tubular end connected to the first end of a respective one of the connection elements.

2. The aircraft wing support structure of claim 1,
   wherein the first end of the connection element comprises a substantially round cross-sectional shape.

3. The aircraft wing support structure of claim 1,
   Wherein each of the bar elements comprises a substantially tubular cross-sectional shape and
   when the connection element is engaged with one of the bar elements, the first end defines an internal shape such that one of the bar elements with a substantially tubular cross-sectional shape fits inside the first end of the connection element.

4. The aircraft wing support structure of claim 1,
   wherein the second end of each of the connection elements comprises a beak shape.

5. The aircraft wing support structure of claim 4,
   wherein the beak shape comprises a first flat plate joined to a second flat plate and the first flat plate and the second flat plate are separated by a slit, the slit accommodating the junction element between the first flat plate and the second flat plate such that the first flat plate of each of the connection elements is connected to a first side of the respective one of the attachment elements of the junction element and the second flat plate of each of the connection elements is connected to a second side of the same respective one of the attachment elements of the junction element, the second side of the respective one of the attachment elements being opposite of the first side of the respective one of the attachment elements of the junction element.

6. The aircraft wing support structure of claim 5, wherein each of the connection elements is a one-piece connection element.

7. The aircraft wing support structure of claim 5, wherein each of the connection elements includes a plurality of parts.

8. The aircraft wing support structure of claim 1, wherein the junction element is shaped to engage each of the connection elements.

9. A wing comprising an aircraft wing support structure of claim 1.

10. An aircraft comprising the aircraft wing support structure of claim 1.

11. The aircraft wing support structure of claim 1, wherein the base portion of the junction element comprises a bottom face element joined to a frame element of an aircraft, the bottom face element being oriented at an angle to an intermediate portion, such that the intermediate portion extends away from the frame element of the aircraft when the bottom face element is joined flush with the frame element of the aircraft, and each of the plurality of the attachment elements comprises an attachment flange extending at an angle from one of a plurality of sides of the intermediate portion for attachment to the second end of a respective one of the plurality of connection elements.

12. The aircraft wing support structure of claim 11, wherein each of the attachment flanges of the junction element is angularly arranged one to the other such that an angle is formed between the plurality of connection elements joined to each of the attachment flanges of the junction element.

* * * * *